(12) United States Patent
DeMuth et al.

(10) Patent No.: US 11,701,819 B2
(45) Date of Patent: Jul. 18, 2023

(54) ADDITIVE MANUFACTURING, SPATIAL HEAT TREATING SYSTEM AND METHOD

(71) Applicant: Seurat Technologies, Inc., Mountain View, CA (US)

(72) Inventors: James A. DeMuth, Woburn, MA (US); Erik Toomre, Los Altos, CA (US); Martin Eberhard, Woodside, CA (US)

(73) Assignee: Seurat Technologies, Inc., Wilmington, MA (US)

( * ) Notice: Subject to any disclaimer, the term of this patent is extended or adjusted under 35 U.S.C. 154(b) by 402 days.

(21) Appl. No.: 15/419,449

(22) Filed: Jan. 30, 2017

(65) Prior Publication Data
US 2017/0232557 A1 Aug. 17, 2017

Related U.S. Application Data

(60) Provisional application No. 62/288,342, filed on Jan. 28, 2016.

(51) Int. Cl.
*B29C 64/153* (2017.01)
*B29C 64/277* (2017.01)
(Continued)

(52) U.S. Cl.
CPC ............ *B29C 64/153* (2017.08); *B22F 10/28* (2021.01); *B22F 10/364* (2021.01); *B22F 12/45* (2021.01); *B23K 26/342* (2015.10); *B23K 26/703* (2015.10); *B28B 1/001* (2013.01); *B28B 17/0081* (2013.01); *B29C 64/277* (2017.08);
(Continued)

(58) Field of Classification Search
CPC .... B23K 26/342; B23K 26/703; B33Y 10/00; B33Y 30/00; B33Y 50/02; B29C 64/277; B29C 64/153; B22F 3/1055; B22F 3/1039; B22F 2999/00; B22F 2003/1057;
(Continued)

(56) References Cited

U.S. PATENT DOCUMENTS

| 4,247,508 A | 1/1981 | Housholder |
| 4,944,817 A | 7/1990 | Bourell et al. |

(Continued)

FOREIGN PATENT DOCUMENTS

| CN | 1593817 A | 3/2005 |
| DE | 102009051551 A1 | 5/2011 |

(Continued)

OTHER PUBLICATIONS

Wu, Dong Ho, and Tomofumi Ikari. "Enhancement of the Output Power of a Terahertz Parametric Oscillator with Recycled Pump Beam." Applied Physics Letters, vol. 95, No. 14, 2009, p. 141105 (Year: 2009).*

(Continued)

*Primary Examiner* — Kevin E Yoon
*Assistant Examiner* — Ryan L Heckman
(74) *Attorney, Agent, or Firm* — David R. Stevens; Stevens Law Group

(57) ABSTRACT

An additive manufacturing system including a two-dimensional energy patterning system for imaging a powder bed is disclosed. The two-dimensional energy patterning system may be used to control the rate of cooling experienced by each successive additive layer. Accordingly, the system may be used to heat treat the various additive layers.

14 Claims, 16 Drawing Sheets

(51) Int. Cl.

| | | |
|---|---|---|
| *B22F 10/28* | (2021.01) | |
| *B22F 12/45* | (2021.01) | |
| *B22F 10/364* | (2021.01) | |
| *B33Y 10/00* | (2015.01) | |
| *B33Y 30/00* | (2015.01) | |
| *B33Y 50/02* | (2015.01) | |
| *B23K 26/342* | (2014.01) | |
| *B23K 26/70* | (2014.01) | |
| *B28B 1/00* | (2006.01) | |
| *B28B 17/00* | (2006.01) | |
| *C21D 1/84* | (2006.01) | |
| *C21D 11/00* | (2006.01) | |
| *B22F 3/10* | (2006.01) | |
| *B22F 10/73* | (2021.01) | |
| *B22F 12/41* | (2021.01) | |
| *B22F 12/44* | (2021.01) | |
| *B22F 12/49* | (2021.01) | |

(52) U.S. Cl.
CPC .............. *B33Y 10/00* (2014.12); *B33Y 30/00* (2014.12); *B33Y 50/02* (2014.12); *C21D 1/84* (2013.01); *C21D 11/005* (2013.01); *B22F 3/1039* (2013.01); *B22F 10/73* (2021.01); *B22F 12/41* (2021.01); *B22F 12/44* (2021.01); *B22F 12/49* (2021.01); *B22F 2999/00* (2013.01); *C04B 2235/6026* (2013.01); *C04B 2235/665* (2013.01); *Y02P 10/25* (2015.11)

(58) Field of Classification Search
CPC ......... C21D 11/005; C21D 1/84; B28B 1/001; B28B 17/0081; Y02P 10/295
See application file for complete search history.

(56) References Cited

U.S. PATENT DOCUMENTS

| | | | |
|---|---|---|---|
| 5,155,324 A | 10/1992 | Deckard et al. | |
| 5,236,637 A | 8/1993 | Hull | |
| 5,282,121 A * | 1/1994 | Bornhorst | G02F 1/133385 |
| | | | 353/54 |
| 5,314,003 A | 5/1994 | Mackay | |
| 5,382,308 A | 1/1995 | Bourell | |
| 5,508,489 A * | 4/1996 | Benda | B22F 3/1055 |
| | | | 219/121.76 |
| 5,601,733 A * | 2/1997 | Partlo | G03F 7/70075 |
| | | | 219/121.75 |
| 5,640,667 A | 6/1997 | Freitag | |
| 5,674,414 A | 10/1997 | Schweizer | |
| 5,837,960 A | 11/1998 | Lewis | |
| 5,980,813 A * | 11/1999 | Narang | B33Y 10/00 |
| | | | 264/494 |
| 6,005,717 A | 12/1999 | Neuberger | |
| 6,405,095 B1 | 6/2002 | Jang | |
| 6,462,306 B1 | 10/2002 | Kitai | |
| 6,560,001 B1 | 5/2003 | Igasaki | |
| 6,676,892 B2 | 1/2004 | Das | |
| 6,717,106 B2 | 4/2004 | Nagano | |
| 6,862,108 B2 * | 3/2005 | Kito | B41J 2/465 |
| | | | 358/1.9 |
| 7,088,432 B2 | 8/2006 | Zhang | |
| 7,444,046 B2 | 10/2008 | Karlsen | |
| 7,509,738 B2 | 3/2009 | Adams | |
| 7,569,174 B2 | 8/2009 | Ruatta | |
| 7,713,048 B2 | 5/2010 | Perret | |
| 7,772,523 B2 | 8/2010 | Tanaka | |
| 7,820,241 B2 | 10/2010 | Perret | |
| 8,199,787 B2 | 6/2012 | Deri | |
| 8,514,475 B2 | 8/2013 | Deri | |
| 8,525,943 B2 | 9/2013 | Burgess | |
| 8,568,646 B2 | 10/2013 | Wang | |
| 8,666,142 B2 | 3/2014 | Shkolnik | |
| 8,784,720 B2 | 7/2014 | Oberhofer | |
| 8,801,418 B2 | 8/2014 | El-siblani | |
| 8,815,143 B2 | 8/2014 | John | |
| 8,902,497 B2 | 12/2014 | Erlandson | |
| 8,982,313 B2 | 3/2015 | Escuti | |
| 9,114,478 B2 | 8/2015 | Scott | |
| 9,136,668 B2 | 9/2015 | Bayramian | |
| 9,172,208 B1 | 10/2015 | Dawson | |
| 9,186,847 B2 | 11/2015 | Fruth | |
| 9,192,056 B2 | 11/2015 | Rubenchik | |
| 9,283,593 B2 | 3/2016 | Bruck | |
| 9,308,583 B2 | 4/2016 | El-dasher | |
| 9,331,452 B2 | 5/2016 | Bayramian | |
| 9,522,426 B2 | 12/2016 | Das | |
| 9,573,193 B2 | 2/2017 | Buller | |
| 9,815,139 B2 | 11/2017 | Bruck | |
| 9,855,625 B2 | 1/2018 | El-dasher | |
| 9,962,767 B2 | 5/2018 | Buller | |
| 10,124,408 B2 | 11/2018 | Kenney | |
| 10,130,993 B2 | 11/2018 | Ljungblad | |
| 10,166,751 B2 | 1/2019 | Kramer | |
| 10,195,692 B2 | 2/2019 | Rockstroh | |
| 10,195,693 B2 | 2/2019 | Buller | |
| 10,279,598 B2 | 5/2019 | Deppe | |
| 10,328,685 B2 | 6/2019 | Jones | |
| 10,335,901 B2 | 7/2019 | Ferrar | |
| 2001/0008230 A1 * | 7/2001 | Keicher | B01F 35/714112 |
| | | | 219/121.84 |
| 2002/0015654 A1 | 2/2002 | Das | |
| 2002/0090313 A1 | 7/2002 | Wang | |
| 2002/0130279 A1 * | 9/2002 | Jain | G03F 7/70358 |
| | | | 250/494.1 |
| 2002/0149137 A1 | 10/2002 | Jang | |
| 2003/0052105 A1 | 3/2003 | Nagano | |
| 2005/0083498 A1 | 4/2005 | Jeng | |
| 2005/0152146 A1 * | 7/2005 | Owen | G01N 21/8806 |
| | | | 362/294 |
| 2007/0122560 A1 | 5/2007 | Adams | |
| 2008/0262659 A1 | 10/2008 | Huskamp | |
| 2009/0020901 A1 | 1/2009 | Schillen | |
| 2009/0206065 A1 | 8/2009 | Kruth | |
| 2009/0221422 A1 | 9/2009 | Miller | |
| 2010/0089881 A1 | 4/2010 | Bruland | |
| 2010/0176539 A1 | 7/2010 | Higashi | |
| 2011/0017199 A1 * | 1/2011 | Hernandez | H02S 40/38 |
| | | | 126/605 |
| 2011/0019705 A1 | 1/2011 | Adams | |
| 2011/0033887 A1 | 2/2011 | Fang | |
| 2011/0278269 A1 | 11/2011 | Gold | |
| 2012/0039565 A1 | 2/2012 | Klein | |
| 2012/0132631 A1 | 5/2012 | Wescott et al. | |
| 2013/0064706 A1 | 3/2013 | Schwarze | |
| 2013/0102447 A1 | 4/2013 | Strong | |
| 2013/0105447 A1 | 5/2013 | Haake | |
| 2013/0112672 A1 | 5/2013 | Keremes | |
| 2013/0136868 A1 | 5/2013 | Bruck | |
| 2013/0140916 A1 * | 6/2013 | Dunlap | F24S 23/30 |
| | | | 307/149 |
| 2013/0170515 A1 | 7/2013 | Watanabe | |
| 2013/0186549 A1 * | 7/2013 | Comb | B29C 65/02 |
| | | | 425/90 |
| 2013/0270750 A1 | 10/2013 | Green | |
| 2013/0271800 A1 | 10/2013 | Kanugo | |
| 2013/0300286 A1 | 11/2013 | Ljungblad | |
| 2013/0302533 A1 | 11/2013 | Bruck | |
| 2013/0309420 A1 | 11/2013 | Flesch | |
| 2014/0034626 A1 * | 2/2014 | Illston | B23K 26/34 |
| | | | 219/121.78 |
| 2014/0085631 A1 | 3/2014 | Lacour | |
| 2014/0154088 A1 | 6/2014 | Etter | |
| 2014/0252687 A1 * | 9/2014 | El-Dasher | B22F 3/1055 |
| | | | 264/497 |
| 2014/0263209 A1 | 9/2014 | Burris et al. | |
| 2014/0271328 A1 * | 9/2014 | Burris | B23K 26/034 |
| | | | 419/53 |
| 2014/0271965 A1 | 9/2014 | Ferrar | |
| 2014/0348692 A1 | 11/2014 | Bessac | |
| 2014/0367894 A1 | 12/2014 | Kramer et al. | |
| 2015/0034604 A1 | 2/2015 | Subramanian | |

(56) References Cited

U.S. PATENT DOCUMENTS

| | | | |
|---|---|---|---|
| 2015/0064048 A1 | 3/2015 | Bessac et al. | |
| 2015/0076732 A1* | 3/2015 | Kemmer | B29C 64/118 |
| | | | 425/375 |
| 2015/0132173 A1 | 5/2015 | Bruck | |
| 2015/0158111 A1 | 6/2015 | Schwarze | |
| 2015/0165556 A1 | 6/2015 | Jones | |
| 2015/0211083 A1 | 7/2015 | Gabilondo | |
| 2015/0273631 A1 | 10/2015 | Kenney et al. | |
| 2015/0273632 A1 | 10/2015 | Chen | |
| 2015/0283612 A1 | 10/2015 | Maeda | |
| 2015/0283614 A1 | 10/2015 | Wu | |
| 2015/0311064 A1 | 10/2015 | Stuart | |
| 2015/0314528 A1 | 11/2015 | Gordon | |
| 2015/0321255 A1 | 11/2015 | Colin | |
| 2015/0343664 A1 | 12/2015 | Liu | |
| 2015/0360418 A1 | 12/2015 | Shah | |
| 2015/0367415 A1* | 12/2015 | Buller | B23K 26/123 |
| | | | 419/53 |
| 2015/0375456 A1 | 12/2015 | Cheverton | |
| 2016/0037149 A1* | 2/2016 | Nishikawa | B33Y 50/00 |
| | | | 348/46 |
| 2016/0067923 A1 | 3/2016 | James | |
| 2016/0082662 A1 | 3/2016 | Majer | |
| 2016/0114432 A1 | 4/2016 | Ferrar | |
| 2016/0175935 A1 | 6/2016 | Ladewig | |
| 2016/0184925 A1* | 6/2016 | Huang | B23K 26/342 |
| | | | 419/53 |
| 2016/0228995 A1 | 8/2016 | Bruck | |
| 2016/0229222 A1* | 8/2016 | Stecker | B29C 64/386 |
| 2016/0236279 A1 | 8/2016 | Ashton | |
| 2016/0243652 A1 | 8/2016 | El-dasher | |
| 2016/0279703 A1 | 9/2016 | Clare | |
| 2016/0279707 A1 | 9/2016 | Mattes | |
| 2016/0318129 A1 | 11/2016 | Hu | |
| 2016/0322777 A1 | 11/2016 | Zediker | |
| 2017/0090460 A1* | 3/2017 | Andrew | B29C 64/386 |
| 2017/0165754 A1* | 6/2017 | Buller | B23K 26/142 |
| 2017/0182556 A1 | 6/2017 | Ramaswamy | |
| 2017/0203364 A1 | 7/2017 | Ramaswamy | |
| 2017/0216966 A1* | 8/2017 | DeMuth | B23K 26/0622 |
| 2017/0219855 A1* | 8/2017 | DeMuth | B29C 64/268 |
| 2017/0225396 A1* | 8/2017 | Tom | B33Y 30/00 |
| 2018/0079003 A1* | 3/2018 | Lin | B23K 26/046 |
| 2018/0086004 A1* | 3/2018 | Van Espen | B29C 64/40 |
| 2018/0233873 A1* | 8/2018 | Chen | H01S 3/042 |
| 2018/0354191 A1 | 12/2018 | Nauka | |

FOREIGN PATENT DOCUMENTS

| | | | | |
|---|---|---|---|---|
| DE | 102010048335 A1 | 4/2012 | | |
| DE | 102013205029 A1 | 9/2014 | | |
| EP | 0402944 A2 | 12/1990 | | |
| EP | 0529816 A1 | 3/1993 | | |
| EP | 3037246 A2 | 3/2015 | | |
| EP | 2875897 A1 | 5/2015 | | |
| EP | 2926979 A1 | 10/2015 | | |
| EP | 3037246 A2 | 6/2016 | | |
| EP | 3135459 A1 * | 3/2017 | ............ | B33Y 10/00 |
| EP | 3368235 A1 | 9/2018 | | |
| EP | 3411233 A1 | 12/2018 | | |
| EP | 2964418 B1 | 5/2019 | | |
| EP | 3825038 A1 | 5/2021 | | |
| GB | 2453945 A | 4/2009 | | |
| JP | 01244609 | 9/1989 | | |
| JP | 5933512 B2 | 6/2016 | | |
| WO | WO/1995/006540 A1 | 3/1995 | | |
| WO | WO/2012/151262 A2 | 11/2012 | | |
| WO | WO2013140147 A1 | 9/2013 | | |
| WO | WO/2014/199134 A1 | 12/2014 | | |
| WO | WO/2014/199149 A1 | 12/2014 | | |
| WO | WO/2014/074954 A3 | 1/2015 | | |
| WO | WO/2015/003804 A1 | 1/2015 | | |
| WO | WO/2015/017077 A1 | 2/2015 | | |
| WO | WO/2015/108991 A2 | 7/2015 | | |
| WO | WO/2015/120168 A1 | 8/2015 | | |
| WO | WO-2015120168 A1 * | 8/2015 | ............ | B22F 3/105 |
| WO | WO 2015120168 A1 | 8/2015 | | |
| WO | WO/2015/191257 A1 | 12/2015 | | |
| WO | WO/2015/134075 A3 | 1/2016 | | |
| WO | WO/2016/071265 A1 | 5/2016 | | |
| WO | WO/2016/079496 A3 | 6/2016 | | |
| WO | WO/2016/110440 A1 | 7/2016 | | |
| WO | WO/2016/201309 A1 | 12/2016 | | |
| WO | WO/2017015241 A1 | 1/2017 | | |
| WO | 2017075408 A1 | 5/2017 | | |
| WO | WO/2017075285 A1 | 5/2017 | | |
| WO | WO2017075285 A8 | 5/2017 | | |
| WO | WO2017136206 A1 | 8/2017 | | |
| WO | WO/2018/087218 A1 | 5/2018 | | |

OTHER PUBLICATIONS

Supplementary European Search Report and Written Opinion for corresponding European Patent Application No. 17 744 666.3 dated Feb. 5, 2019, 9 pp.

International Search Report for PCT/US17/012546, corresponding to U.S. Appl. No. 15/008,989, 14 pages.

* cited by examiner

ADDITIVE MANUFACTURING, SPATIAL HEAT TREATING SYSTEM AND METHOD

CROSS-REFERENCE TO RELATED PATENT APPLICATION

The present disclosure is part of a non-provisional patent application claiming the priority benefit of U.S. Patent Application No. 62/288,342, filed on Jan. 28, 2016, which is hereby incorporated by reference in its entirety.

TECHNICAL FIELD

The present disclosure relates generally to a system and method for additive manufacture and, more particularly, powder bed fusion using two-dimensional energy patterning to both print and heat treat.

BACKGROUND

Traditional component machining often relies on removal of material by drilling, cutting, or grinding to form a part. In contrast, additive manufacturing, also referred to as three-dimensional (3D) printing, typically involves sequential layer-by-layer addition of material to build a part. In view of the current state of the art in 3D printing, what is needed are systems and methods for smooth and efficient manufacturing of printed parts.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

An additive manufacturing system may include one or more energy sources, including in one embodiment, one or more laser or electron beams, positioned to emit one or more energy beams. Beam shaping optics may receive the one or more energy beams from the energy source and form a single beam. An energy patterning unit may receive or generate the single beam and transfer a two-dimensional pattern to the beam, and may reject the unused energy not in the pattern. An image relay may receive the two-dimensional patterned beam and focus it as a two-dimensional image to a desired location on a height fixed or movable build platform (e.g., a powder bed). In certain embodiments, some or all of any rejected energy from the energy patterning unit may be reused.

In some embodiments, multiple beams from the laser array(s) may be combined using a beam homogenizer. This combined beam can be directed at an energy patterning unit that includes either a transmissive or reflective pixel addressable light valve. In one embodiment, the pixel addressable light valve includes both a liquid crystal module having a polarizing element and a light projection unit providing a two-dimensional input pattern. The two-dimensional image focused by the image relay can be sequentially directed toward multiple locations on a powder bed to build a 3D structure.

Figure 1A:
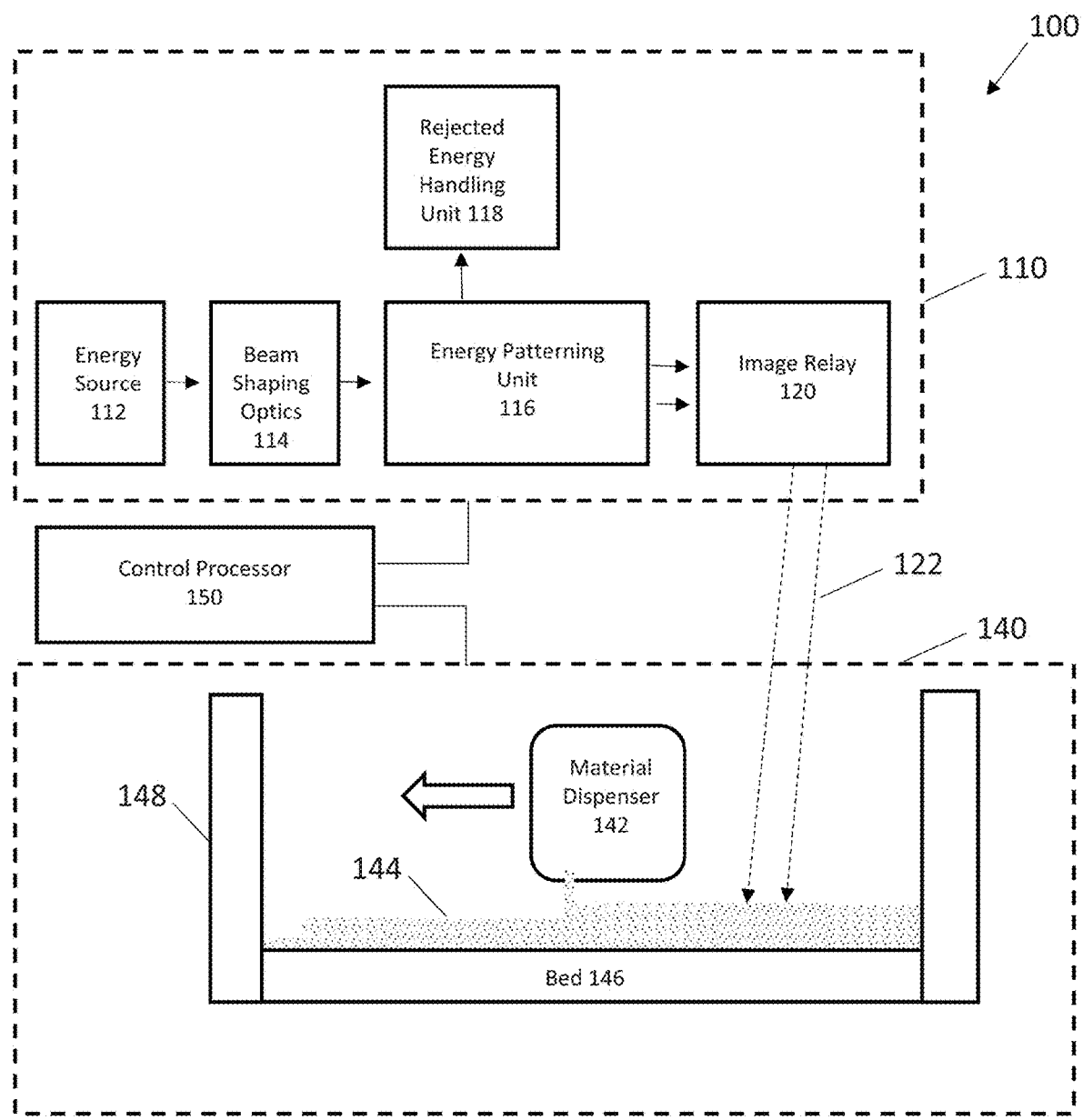
FIG. 1A illustrates an additive manufacturing system.

As seen in FIG. 1, an additive manufacturing system 100 may have an energy patterning system 110 with an energy source 112 that can direct one or more continuous or intermittent energy beam(s) toward beam shaping optics 114. After shaping, if necessary, the beam may be patterned by an energy patterning unit 116, with generally some energy being directed to a rejected energy handling unit 118. Patterned energy may be relayed by image relay 120 toward an article processing unit 140, typically as a two-dimensional image 122 focused near a bed 146. The bed 146 (with optional walls 148) can form a chamber containing material 144 dispensed by material dispenser 142. Patterned energy, directed by the image relay 120, can melt, fuse, sinter, amalgamate, change crystal structure, influence stress patterns, or otherwise chemically or physically modify the dispensed material 144 to form structures with desired properties.

An energy source 112 may generate photon (light), electron, ion, or other suitable energy beams or fluxes capable of being directed, shaped, and patterned. Multiple energy sources can be used in combination. The energy source 112 can include lasers, incandescent light, concentrated solar, other light sources, electron beams, or ion beams. Possible laser types include, but are not limited to: Gas Lasers, Chemical Lasers, Dye Lasers, Metal Vapor Lasers, Solid State Lasers (e.g. fiber), Semiconductor (e.g. diode) Lasers, Free electron laser, Gas dynamic laser, "Nickel-like" Samarium laser, Raman laser, or Nuclear pumped laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical laser can include lasers such as a Hydrogen fluoride laser, Deuterium fluoride laser, COIL (Chemical oxygen-iodine laser), or Agil (All gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/MnCl$_2$) vapor laser.

A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate (Nd:YVO$_4$) laser, Neodymium doped yttrium calcium oxoborateNd:YCa$_4$O(BO$_3$)$^3$ or simply Nd:YCOB, Neodymium glass (Nd:Glass) laser, Titanium sapphire (Ti:sapphire) laser, Thulium YAG (Tm:YAG) laser, Ytterbium YAG (Yb:YAG) laser, Ytterbium:2O$_3$ (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium)aluminum fluoride (Ce:LiSAF, Ce:LiCAF), Promethium 147 doped phosphate glass (147Pm$^{+3}$:Glass) solid-state laser, Chromium doped chrysoberyl (alexandrite) laser, Erbium doped anderbium-ytterbium co-doped glass lasers, Trivalent uranium doped calcium fluoride (U:CaF$_2$) solid-state laser, Divalent samarium doped calcium fluoride (Sm:CaF$_2$) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof.

For example, in one embodiment a single Nd:YAG q-switched laser can be used in conjunction with multiple semiconductor lasers. In another embodiment, an electron beam can be used in conjunction with an ultraviolet semiconductor laser array. In still other embodiments, a two-dimensional array of lasers can be used. In some embodiments with multiple energy sources, pre-patterning of an energy beam can be done by selectively activating and deactivating energy sources.

A beam shaping unit 114 may include a great variety of imaging optics to combine, focus, diverge, reflect, refract, homogenize, adjust intensity, adjust frequency, or otherwise shape and direct one or more energy beams received from the energy source 112 toward the energy patterning unit 116. In one embodiment, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

An energy patterning unit 116 may include static or dynamic energy patterning elements. For example, photon, electron, or ion beams can be blocked by masks with fixed or movable elements. To increase flexibility and ease of image patterning, pixel addressable masking, image generation, or transmission can be used. In some embodiments, the energy patterning unit may include addressable light valves, alone or in conjunction with other patterning mechanisms to provide patterning. The light valves can be transmissive, reflective, or use a combination of transmissive and reflective elements. Patterns can be dynamically modified using electrical or optical addressing. In one embodiment, a transmissive optically addressed light valve acts to rotate polarization of light passing through the valve, with optically addressed pixels forming patterns defined by a light projection source. In another embodiment, a reflective optically addressed light valve includes a write beam for modifying polarization of a read beam. In yet another embodiment, an electron patterning device receives an address pattern from an electrical or photon stimulation source and generates a patterned emission of electrons.

A rejected energy handling unit 118 may be used to disperse, redirect, or utilize energy not patterned and passed through the energy pattern image relay 120. In one embodiment, the rejected energy handling unit 118 can include passive or active cooling elements that remove heat from the energy patterning unit 116. In other embodiments, the rejected energy handling unit can include a "beam dump" to absorb and convert to heat any beam energy not used in defining the energy pattern. In still other embodiments, rejected beam energy can be recycled using beam shaping optics 114. Alternatively, or in addition, rejected beam energy can be directed to the article processing unit 140 for heating or further patterning. In certain embodiments, rejected beam energy can be directed to additional energy patterning systems or article processing units.

An image relay 120 may receive a patterned image (typically a two-dimensional image) from the energy patterning unit 116 and guide it toward the article processing unit 140. In a manner similar to beam shaping optics 114, the image relay 120 can include optics to combine, focus, diverge, reflect, refract, adjust intensity, adjust frequency, or otherwise shape and direct the patterned image.

An article processing unit 140 may include a walled chamber 148 and bed 146, and a material dispenser 142 for distributing material. The material dispenser 142 can distribute, remove, mix, provide gradations or changes in material type or particle size, or adjust layer thickness of material. The material may include metal, ceramic, glass, polymeric powders, other melt-able material capable of undergoing a thermally induced phase change from solid to liquid and back again, or combinations thereof. The material may further include composites of melt-able material and non-melt-able material where either or both components can be selectively targeted by the imaging relay system to melt the component that is melt-able, while either leaving along the non-melt-able material or causing it to undergo a vaporizing/destroying/combusting or otherwise destructive process. In certain embodiments, slurries, sprays, coatings, wires, strips, or sheets of materials can be used. Unwanted material can be removed for disposable or recycling by use of blowers, vacuum systems, sweeping, vibrating, shaking, tipping, or inversion of the bed 146.

In addition to material handling components, the article processing unit 140 can include components for holding and supporting 3D structures, mechanisms for heating or cooling the chamber, auxiliary or supporting optics, and sensors and control mechanisms for monitoring or adjusting material or environmental conditions. The article processing unit can, in whole or in part, support a vacuum or inert gas atmosphere to reduce unwanted chemical interactions as well as to mitigate the risks of fire or explosion (especially with reactive metals).

A control processor 150 may be connected to control any components of additive manufacturing system 100. The control processor 150 can be connected to variety of sensors, actuators, heating or cooling systems, monitors, and controllers to coordinate operation. A wide range of sensors, including imagers, light intensity monitors, thermal, pressure, or gas sensors can be used to provide information used in control or monitoring. The control processor can be a single central controller, or alternatively, can include one or more independent control systems. The controller processor 150 may be provided with an interface to allow input of manufacturing instructions. Use of a wide range of sensors allows various feedback control mechanisms that improve quality, manufacturing throughput, and energy efficiency.

Figure 1B:
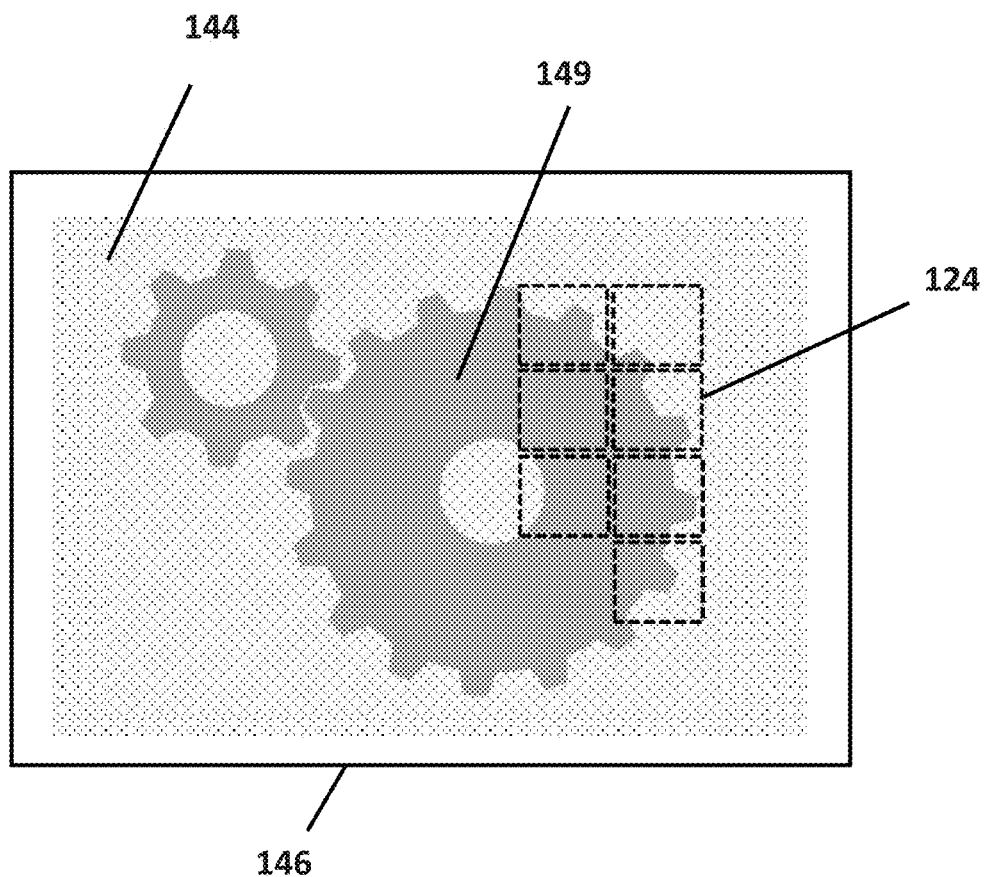
FIG. 1B is a top view of a structure being formed on an additive manufacturing system.

FIG. 1B is a schematic drawing illustrating a bed 146 that supports material 144. Using a series of sequentially applied, two-dimensional patterned energy beam images (squares in dotted outline 124), a structure 149 may be additively manufactured. As will be understood, image patterns having non-square boundaries can be used, overlapping or interpenetrating images can be used, and images can be provided by two or more energy patterning systems. In other embodiments, images can be formed in conjunction with directed electron or ion beams, or with printed or selective spray systems.

Figure 2:
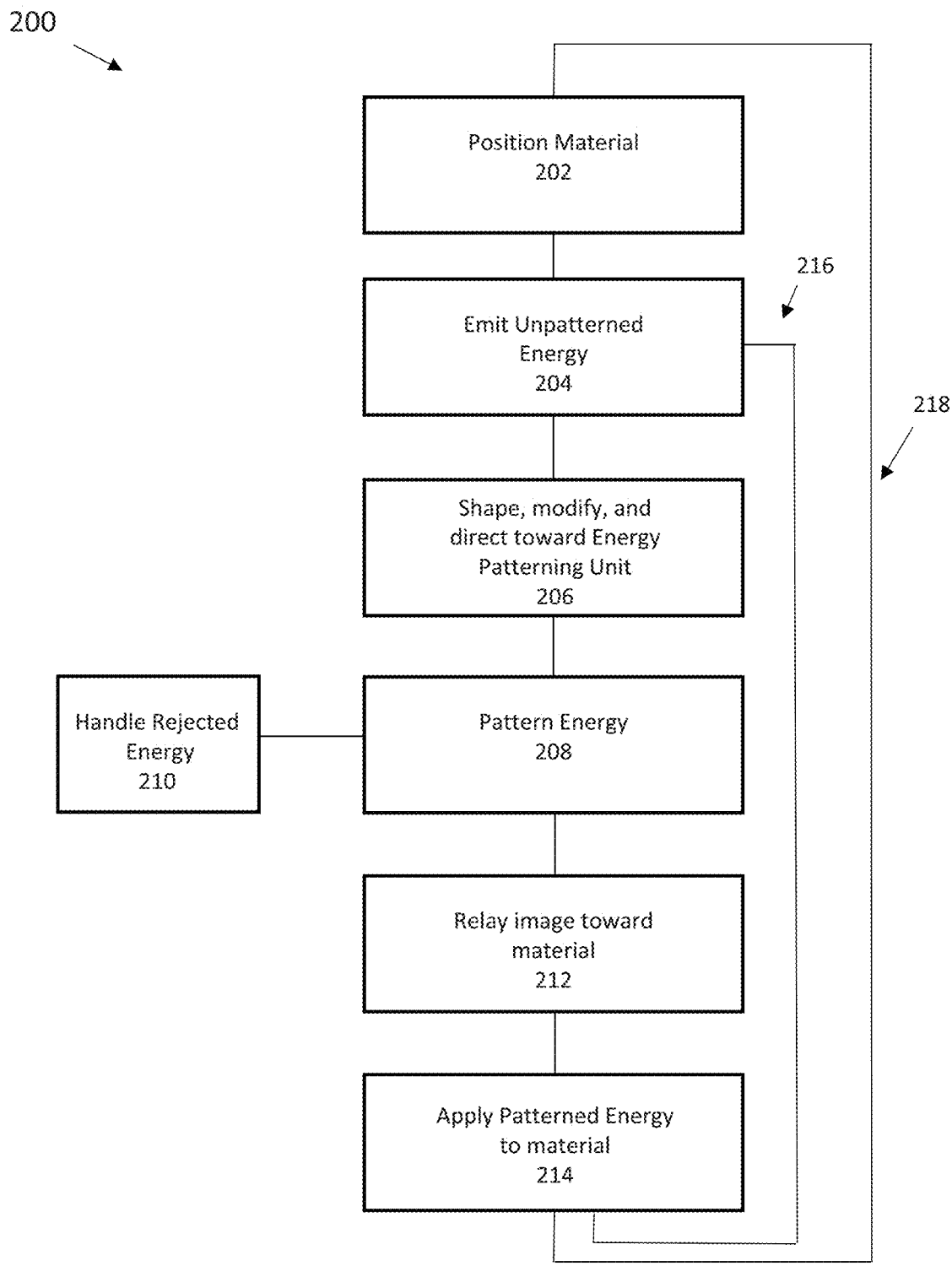
FIG. 2 illustrates an additive manufacturing method.

FIG. 2 is a flow chart illustrating one embodiment of an additive manufacturing process supported by the described optical and mechanical components. In step 202, material may be positioned in a bed, chamber, or other suitable support. The material can be a powder capable of being melted, fused, sintered, induced to change crystal structure, have stress patterns influenced, or otherwise chemically or physically modified to form structures with desired properties.

In step 204, unpatterned energy may be emitted by one or more energy emitters, including but not limited to solid state or semiconductor lasers, or electrical power supply flowing electrons down a wire. In step 206, the unpatterned energy may be shaped and modified (e.g. intensity modulated or focused). In step 208, this unpatterned energy may be patterned, with energy not forming a part of the pattern being handled in step 210 (this can include conversion to waste heat, or recycling as patterned or unpatterned energy). In step 212, the patterned energy, now forming a two-dimensional image may be relayed toward the material. In step 214, the image may be applied to the material, building a portion of a 3D structure. These steps can be repeated (loop 218) until the image (or different and subsequent image) has been applied to all necessary regions of a top layer of the material. When application of energy to the top layer of the material is finished, a new layer can be applied (loop 216) to continue building the 3D structure. These process loops are continued until the 3D structure is complete, when remaining excess material can be removed or recycled.

Figure 3A:
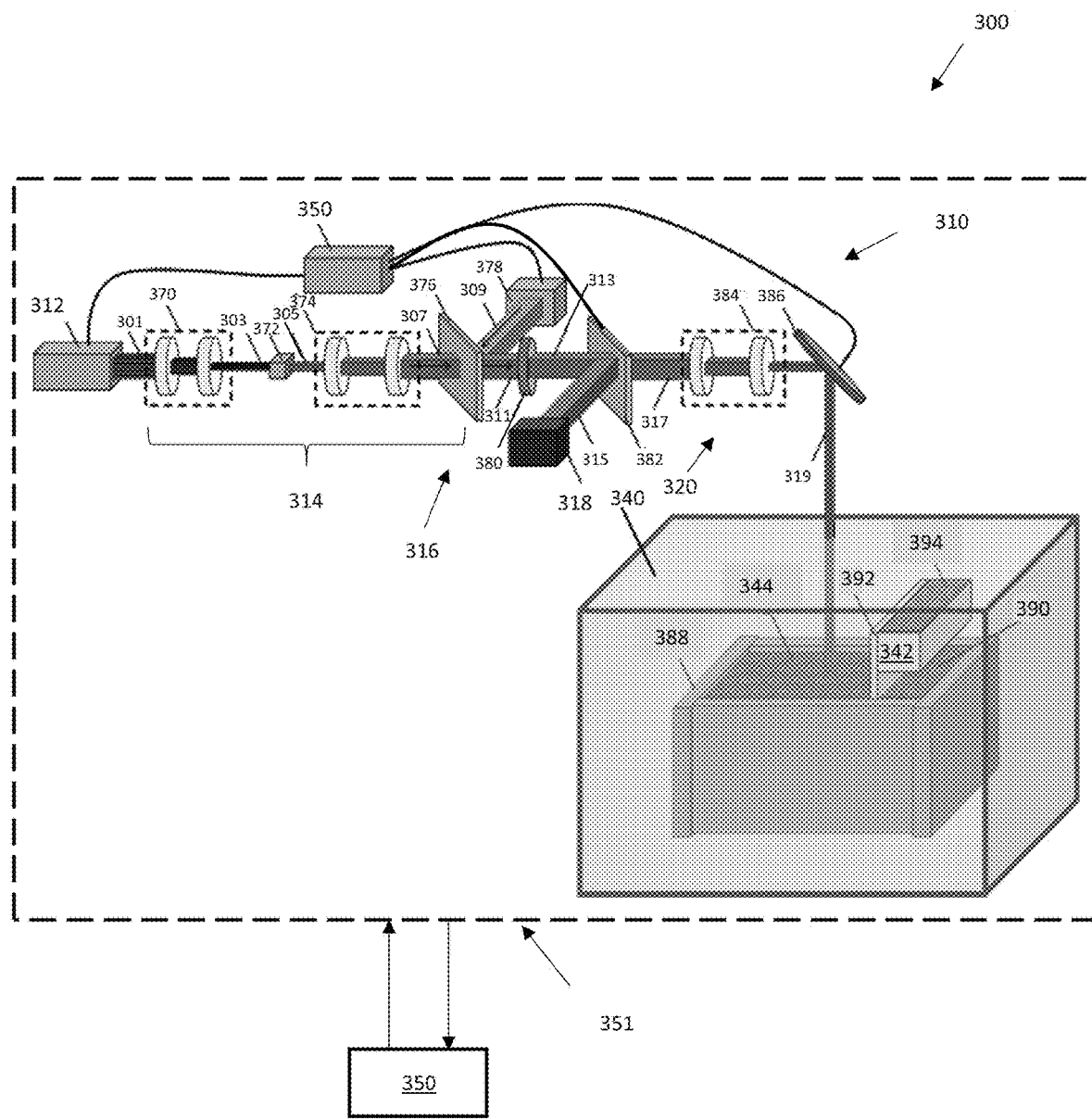
FIG. 3A is a schematic drawing illustrating an additive manufacturing system including lasers.

FIG. 3A is one embodiment of an additive manufacturing system 300 that uses multiple semiconductor lasers as part of an energy patterning system 310. A control processor 350 can be connected to variety of sensors, actuators, heating or cooling systems, monitors, and controllers to coordinate operation of multiple lasers 312, light patterning unit 316, and image relay 320, as well as any other component of system 300. These connections are generally indicated by a dotted outline 351 surrounding components of system 300. As will be appreciated, connections can be wired or wireless, continuous or intermittent, and include capability for feedback (for example, thermal heating can be adjusted in response to sensed temperature). The multiple lasers 312 can emit a beam 301 of light at a 1000 nm wavelength that, for example, is 90 mm wide by 20 mm tall. The beam 301 may be resized by imaging optics 370 to create beam 303. Beam 303 may be 6 mm wide by 6 mm tall, and may be incident on light homogenization device 372 which blends light together to create blended beam 305. Beam 305 may then be incident on imaging assembly 374 which reshapes the light into beam 307 and may then be incident on hot cold mirror 376. The mirror 376 allows 1000 nm light to pass, but may reflect 450 nm light. A light projector 378 capable of projecting low power light at 1080p pixel resolution and 450 nm emits beam 309, which may then be incident on hot cold mirror 376. Beams 307 and 309 overlay in beam 311, and both may be imaged onto optically addressed light valve 380 in, for example, a 20 mm wide, 20 mm tall image. Images formed from the homogenizer 372 and the projector 378 may be recreated and overlaid on light valve 380.

The optically addressed light valve 380 may be stimulated by the light (typically ranging from 400-500 nm) and may imprint a polarization rotation pattern in transmitted beam 313 which may be incident upon polarizer 382. The polarizer 382 may split the two polarization states, transmitting p-polarization into beam 317 and reflecting s-polarization into beam 315 which may then be sent to a beam dump 318 that handles the rejected energy. As will be understood, in other embodiments the polarization could be reversed, with s-polarization formed into beam 317 and reflecting p-polarization into beam 315. Beam 317 may enter the final imaging assembly 320 which includes optics 384 that resize the patterned light. This beam may reflect off of a movable mirror 386 to beam 319, which may terminate in a focused image applied to material bed 344 in an article processing unit 340. The depth of field in the image may be selected to span multiple layers, providing optimum focus in the range of a few layers of error or offset.

The bed 390 can be raised or lowered (vertically indexed) within chamber walls 388 that contain material 344 dispensed by material dispenser 342. In certain embodiments, the bed 390 can remain fixed, and optics of the final imaging assembly 320 can be vertically raised or lowered. Material distribution may be provided by a sweeper mechanism 392 that can evenly spread powder held in hopper 394, being able to provide new layers of material as needed. An image 6 mm wide by 6 mm tall can be sequentially directed by the movable mirror 386 at different positions of the bed.

When using a powdered ceramic or metal material in this additive manufacturing system 300, the powder can be spread in a thin layer, approximately 1-3 particles thick, on top of a base substrate (and subsequent layers) as the part is built. When the powder is melted, sintered, or fused by a patterned beam 319, it may amalgamate with the underlying layer, creating a solid structure. The patterned beam 319 can be operated in a pulsed fashion at 40 Hz, moving to the subsequent 6 mm×6 mm image locations at intervals of 10 ms to 0.5 ms (with 3 to 0.1 ms being desirable) until the selected patterned areas of powder have been melted. The bed 390 may then lower itself by a thickness corresponding to one layer, and the sweeper mechanism 392 may spread a new layer of powdered material. This process may be repeated until the 2D layers have built up the desired 3D structure. In certain embodiments, the article processing unit 340 can have a controlled atmosphere. This allows reactive materials to be manufactured in an inert gas, or vacuum environment without the risk of oxidation or chemical reaction, or fire or explosion (if reactive metals are used).

Figure 3B:
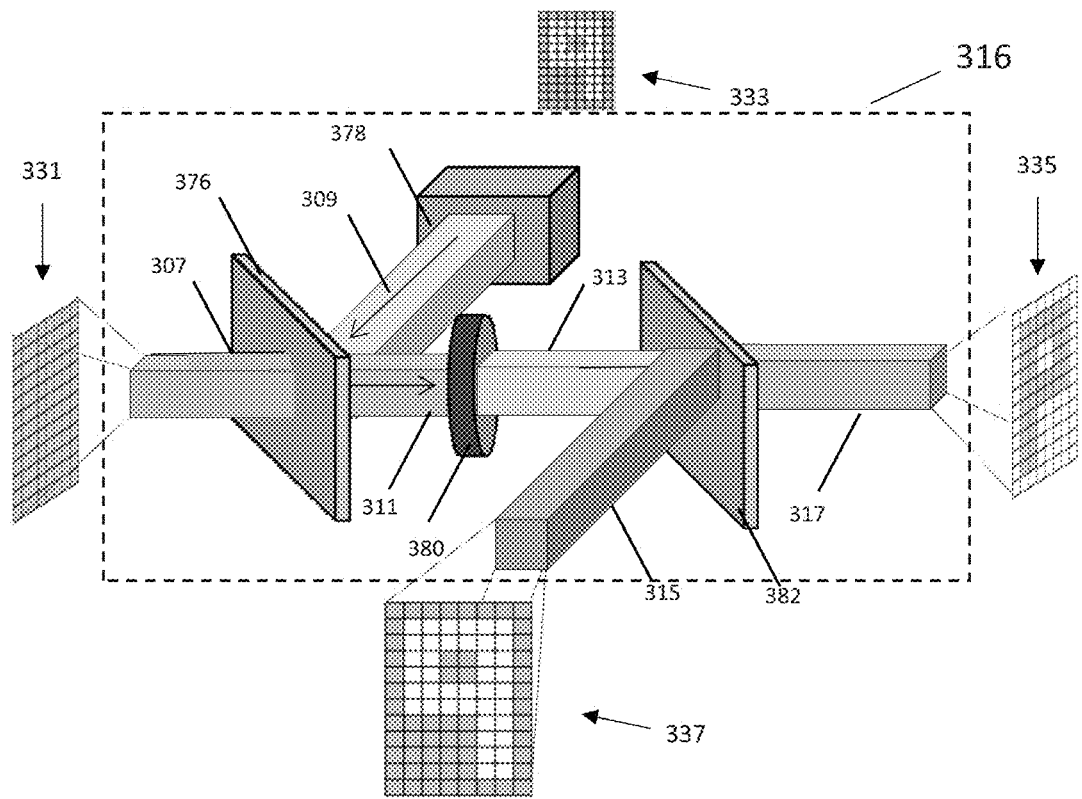
FIG. 3B is a detailed description of the light patterning unit shown in FIG. 3A.

FIG. 3B illustrates in more detail operation of the light patterning unit 316 of FIG. 3A. As seen in FIG. 3B, a representative input pattern 333 (here seen as the numeral "9") may be defined in an 8×12 pixel array of light projected as beam 309 toward mirror 376. Each grey pixel represents a light filled pixel, while white pixels are unlit. In practice, each pixel can have varying levels of light, including light-free, partial light intensity, or maximal light intensity. Unpatterned light 331 that forms beam 307 may be directed and passes through a hot/cold mirror 376, where it combines with patterned beam 309. After reflection by the hot/cold mirror 376, the patterned light beam 311 formed from overlay of beams 307 and 309 in beam 311, and both may be imaged onto optically addressed light valve 380. The optically addressed light valve 380, which would rotate the polarization state of unpatterned light 331, may be stimulated by the patterned light beam 309, 311 to selectively not rotate the polarization state of polarized light 307, 311 in the pattern of the numeral "9" into beam 313. The unrotated light representative of pattern 333 in beam 313 may then be allowed to pass through polarizer mirror 382 resulting in beam 317 and pattern 335. Polarized light in a second rotated state may be rejected by polarizer mirror 382, into beam 315 carrying the negative pixel pattern 337 consisting of a light-free numeral "9".

Other types of light valves can be substituted or used in combination with the described light valve. Reflective light valves, or light valves base on selective diffraction or refraction can also be used. In certain embodiments, non-optically addressed light valves can be used. These can include but are not limited to electrically addressable pixel elements, movable mirror or micro-mirror systems, piezo or micro-actuated optical systems, fixed or movable masks, or shields, or any other conventional system able to provide high intensity light patterning. For electron beam patterning, these valves may selectively emit electrons based on an address location, thus imbuing a pattern on the beam of electrons leaving the valve.

Figure 3C:
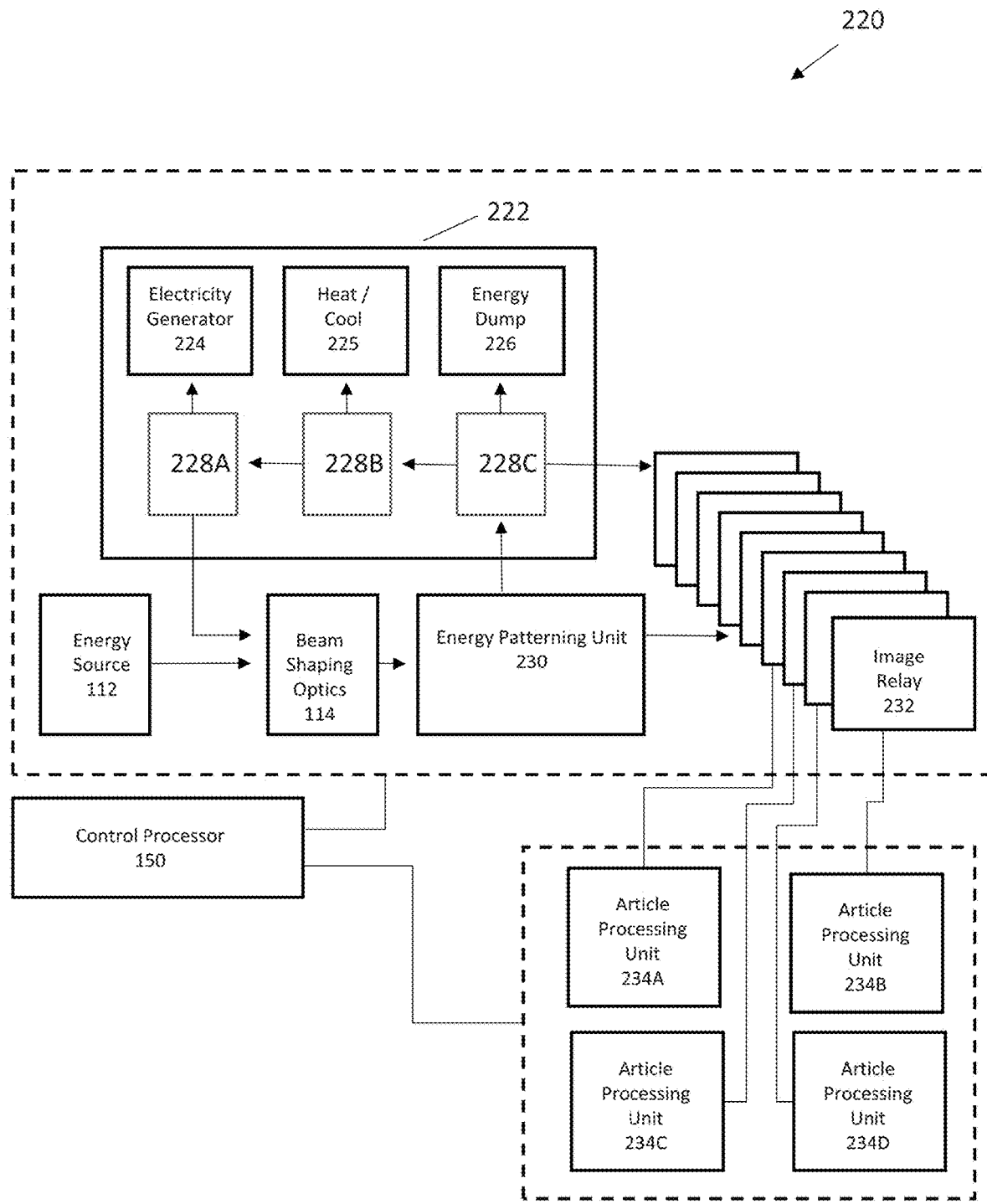
FIG. 3C is one embodiment of an additive manufacturing system with a "switchyard" for directing and repatterning light using multiple image relays.

FIG. 3C is one embodiment of an additive manufacturing system that includes a switchyard system enabling reuse of patterned two-dimensional energy. Similar to the embodiment discussed with respect to FIG. 1A, an additive manufacturing system 220 has an energy patterning system with an energy source 112 that directs one or more continuous or intermittent energy beam(s) toward beam shaping optics 114. After shaping, the beam may be two-dimensionally patterned by an energy patterning unit 230, with generally some energy being directed to a rejected energy handling unit 222. Patterned energy may be relayed by one of multiple image relays 232 toward one or more article processing units 234A, 234B, 234C, or 234D, typically as a two-dimensional image focused near a movable or fixed height bed. The bed (with optional walls) can form a chamber containing material dispensed by material dispenser. Patterned energy, directed by the image relays 232, can melt, fuse, sinter, amalgamate, change crystal structure, influence stress patterns, or otherwise chemically or physically modify the dispensed material to form structures with desired properties.

In this embodiment, the rejected energy handling unit has multiple components to permit reuse of rejected patterned energy. Relays 228A, 228B, and 228C can respectively transfer energy to an electricity generator 224, a heat/cool thermal management system 225, or an energy dump 226. Optionally, relay 228C can direct patterned energy into the image relay 232 for further processing. In other embodiments, patterned energy can be directed by relay 228C, to relay 228B and 228A for insertion into the energy beam(s) provided by energy source 112. Reuse of patterned images may also be possible using image relay 232. Images can be redirected, inverted, mirrored, sub-patterned, or otherwise transformed for distribution to one or more article processing units. 234A-D. Advantageously, reuse of the patterned light can improve energy efficiency of the additive manufacturing process, and in some cases improve energy intensity directed at a bed, or reduce manufacture time.

Figure 3D:
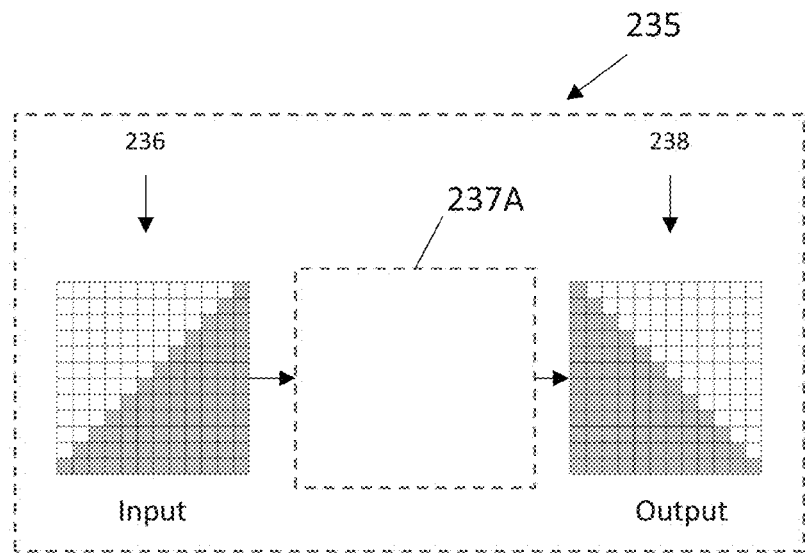
FIG. 3D illustrates a simple mirror image pixel remapping.

FIG. 3D is a schematic drawing 235 illustrating a simple geometrical transformation of a rejected energy beam for reuse. An input pattern 236 may be directed into an image relay 237A capable of providing a mirror image pixel pattern 238. As will be appreciated, more complex pixel transformations are possible, including geometrical transformations, or pattern remapping of individual pixels and groups of pixels. Instead of being wasted in a beam dump, this remapped pattern can be directed to an article processing unit to improve manufacturing throughput or beam intensity.

Figure 3E:
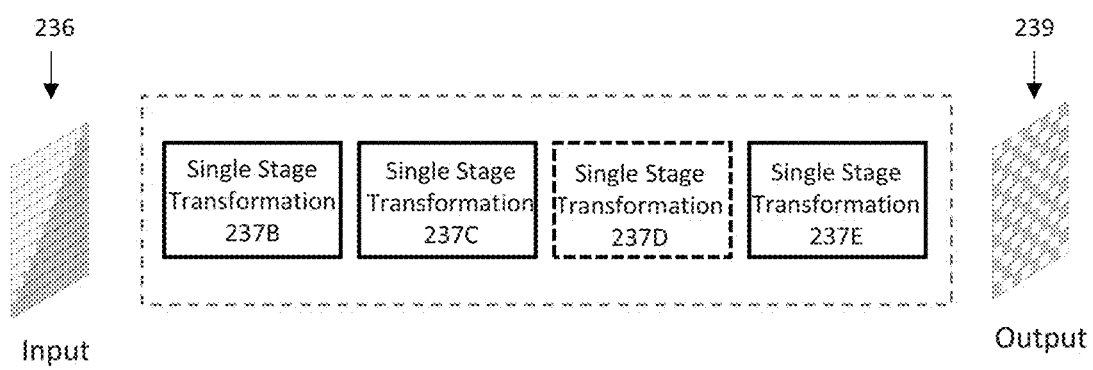
FIG. 3E illustrates a series of image transforming image relays for pixel remapping.

FIG. 3E is a schematic drawing 235 illustrating multiple transformations of a rejected energy beam for reuse. An input pattern 236 may be directed into a series of image relays 237B-E capable of providing a pixel pattern 239.

Figure 3F:
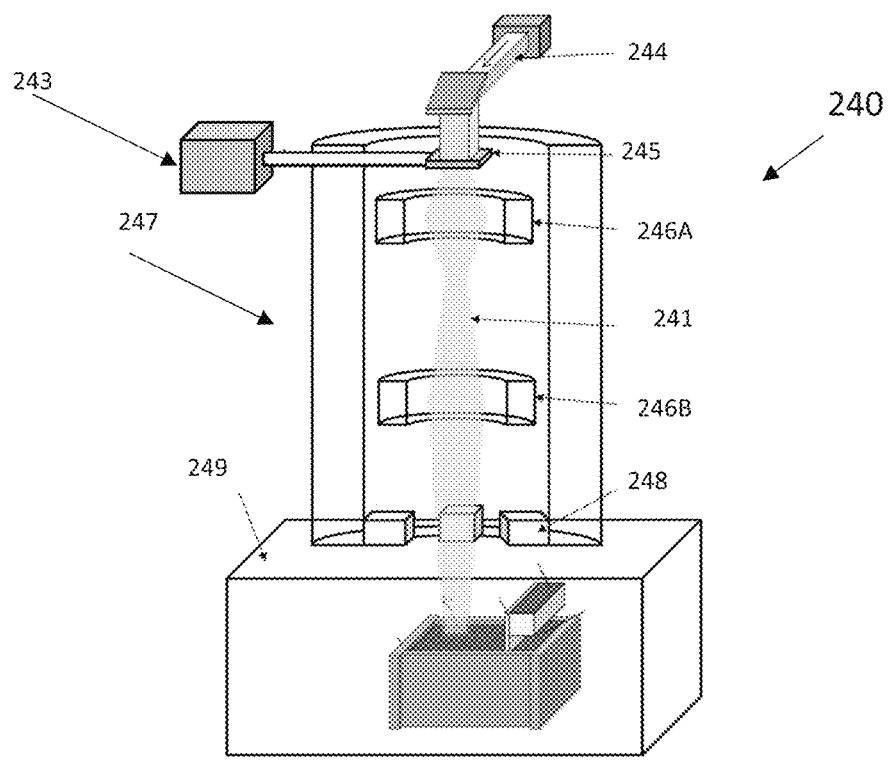
FIG. 3F illustrates an patternable electron energy beam additive manufacturing system.
Figure 3G:
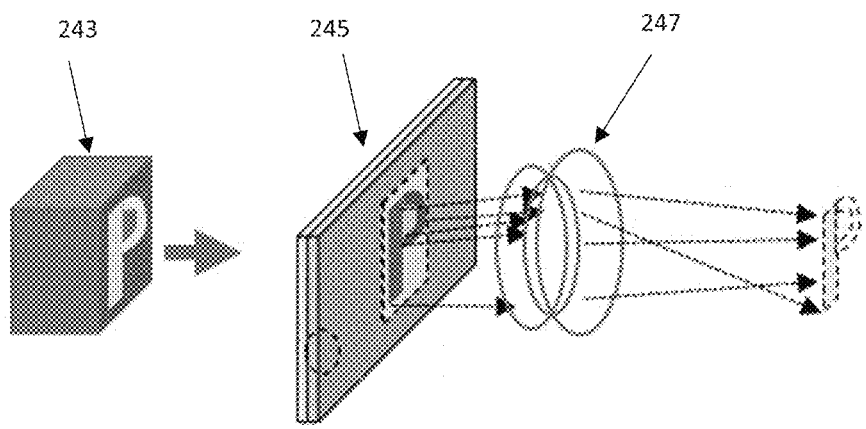
FIG. 3G illustrates a detailed description of the electron beam patterning unit shown in FIG. 3F FIG. 4A-C illustrate various beam combining embodiments.

FIGS. 3F and 3G illustrates a non-light based energy beam system 240 that includes a patterned electron beam 241 capable of producing, for example, a "P" shaped pixel image. A high voltage electricity power system 243 may be connected to an optically addressable patterned cathode unit 245. In response to application of a two-dimensional patterned image by projector 244, the cathode unit 245 may be stimulated to emit electrons wherever the patterned image is optically addressed. Focusing of the electron beam pattern may be provided by an image relay system 247 that includes imaging coils 246A and 246B. Final positioning of the patterned image may be provided by a deflection coil 248 that is able to move the patterned image to a desired position on a bed of additive manufacturing component 249.

In another embodiment supporting light recycling and reuse, multiplex multiple beams of light from one or more light sources may be provided. The multiple beams of light may be reshaped and blended to provide a first beam of light. A spatial polarization pattern may be applied on the first beam of light to provide a second beam of light. Polarization states of the second beam of light may be split to reflect a third beam of light, which may be reshaped into a fourth beam of light. The fourth beam of light may be introduced as one of the multiple beams of light to result in a fifth beam of light. In effect, this or similar systems can reduce energy costs associated with an additive manufacturing system. By collecting, beam combining, homogenizing and re-introducing unwanted light rejected by a spatial polarization valve or light valve operating in polarization modification mode, overall transmitted light power can potentially be unaffected by the pattern applied by a light valve. This advantageously results in an effective re-distribution of the light passing through the light valve into the desired pattern, increasing the light intensity proportional to the amount of area patterned.

Combining beams from multiple lasers into a single beam is one way to increasing beam intensity. In one embodiment, multiple light beams, each having a distinct light wavelength, can be combined using either wavelength selective mirrors or diffractive elements. In certain embodiments, reflective optical elements that are not sensitive to wavelength dependent refractive effects can be used to guide a multiwavelength beam.

Patterned light can be directed using movable mirrors, prisms, diffractive optical elements, or solid state optical systems that do not require substantial physical movement. In one embodiment, a magnification ratio and an image distance associated with an intensity and a pixel size of an incident light on a location of a top surface of a powder bed can be determined for an additively manufactured, three-dimensional (3D) print job. One of a plurality of lens assemblies can be configured to provide the incident light having the magnification ratio, with the lens assemblies both a first set of optical lenses and a second sets of optical lenses, and with the second sets of optical lenses being swappable from the lens assemblies. Rotations of one or more sets of mirrors mounted on compensating gantries and a final mirror mounted on a build platform gantry can be used to direct the incident light from a precursor mirror onto the location of the top surface of the powder bed. Translational movements of compensating gantries and the build platform gantry may also be able to ensure that distance of the incident light from the precursor mirror to the location of the top surface of the powder bed may be substantially equivalent to the image distance. In effect, this enables a quick change in the optical beam delivery size and intensity across locations of a build area for different powdered materials while ensuring high availability of the system.

In certain embodiments, a plurality of build chambers, each having a build platform to hold a powder bed, can be used in conjunction with multiple optical-mechanical assemblies arranged to receive and direct the one or more incident energy beams into the build chambers. Multiple chambers allow for concurrent printing of one or more print jobs inside one or more build chambers. In other embodiments, a removable chamber sidewall can simplify removal of printed objects from build chambers, allowing quick exchanges of powdered materials. The chamber can also be equipped with an adjustable process temperature controls.

In another embodiment, one or more build chambers can have a build chamber that may be maintained at a fixed height, while optics are vertically movable. A distance between final optics of a lens assembly and a top surface of powder bed a may be managed to be essentially constant by indexing final optics upwards, by a distance equivalent to a thickness of a powder layer, while keeping the build platform at a fixed height. Advantageously, as compared to a vertically moving the build platform, large and heavy objects can be more easily manufactured, since precise micron scale movements of the build platform are not needed. Typically, build chambers intended for metal powders with a volume more than ~0.1-0.2 cubic meters (i.e., greater than 100-200 liters or heavier than 500-1,000 kg) will most benefit from keeping the build platform at a fixed height.

In one embodiment, a portion of the layer of the powder bed may be selectively melted or fused to form one or more temporary walls out of the fused portion of the layer of the powder bed to contain another portion of the layer of the powder bed on the build platform. In selected embodiments, a fluid passageway can be formed in the one or more first walls to enable improved thermal management.

Improved powder handling can be another aspect of an improved additive manufacturing system. A build platform supporting a powder bed can be capable of tilting, inverting, and shaking to separate the powder bed substantially from the build platform in a hopper. The powdered material forming the powder bed may be collected in a hopper for reuse in later print jobs. The powder collecting process may be automated, and vacuuming or gas jet systems also used to aid powder dislodgement and removal.

Some embodiments of the disclosed additive manufacturing system can be configured to easily handle parts longer than an available chamber. A continuous (long) part can be sequentially advanced in a longitudinal direction from a first zone to a second zone. In the first zone, selected granules of a granular material can be amalgamated. In the second zone, unamalgamated granules of the granular material can be removed. The first portion of the continuous part can be advanced from the second zone to a third zone, while a last portion of the continuous part is formed within the first zone and the first portion is maintained in the same position in the lateral and transverse directions that the first portion occupied within the first zone and the second zone. In effect, additive manufacture and clean-up (e.g., separation and/or reclamation of unused or unamalgamated granular material) may be performed in parallel (i.e., at the same time) at different locations or zones on a part conveyor, with no need to stop for removal of granular material and/or parts.

In another embodiment, additive manufacturing capability can be improved by use of an enclosure restricting an exchange of gaseous matter between an interior of the enclosure and an exterior of the enclosure. An airlock provides an interface between the interior and the exterior; with the interior having multiple additive manufacturing chambers, including those supporting power bed fusion. A gas management system maintains gaseous oxygen within the interior at or below a limiting oxygen concentration, increasing flexibility in types of powder and processing that can be used in the system.

In another manufacturing embodiment, capability can be improved by having a 3D printer contained within an enclosure, the printer able to create a part having a weight greater than or equal to 2,000 kilograms. A gas management system may maintain gaseous oxygen within the enclosure at concentrations below the atmospheric level. In some embodiments, a wheeled vehicle may transport the part from inside the enclosure, through an airlock, since the airlock operates to buffer between a gaseous environment within the enclosure and a gaseous environment outside the enclosure, and to a location exterior to both the enclosure and the airlock.

Other manufacturing embodiments involve collecting powder samples in real-time in a powder bed fusion additive manufacturing system. An ingester system may be used for in-process collection and characterizations of powder samples. The collection may be performed periodically and the results of characterizations result in adjustments to the powder bed fusion process. The ingester system can optionally be used for one or more of audit, process adjustments or actions such as modifying printer parameters or verifying proper use of licensed powder materials.

Yet another improvement to an additive manufacturing process can be provided by use of a manipulator device such as a crane, lifting gantry, robot arm, or similar that allows for the manipulation of parts that would be difficult or impossible for a human to move is described. The manipulator device can grasp various permanent or temporary additively manufactured manipulation points on a part to enable repositioning or maneuvering of the part.

Figure 4A:
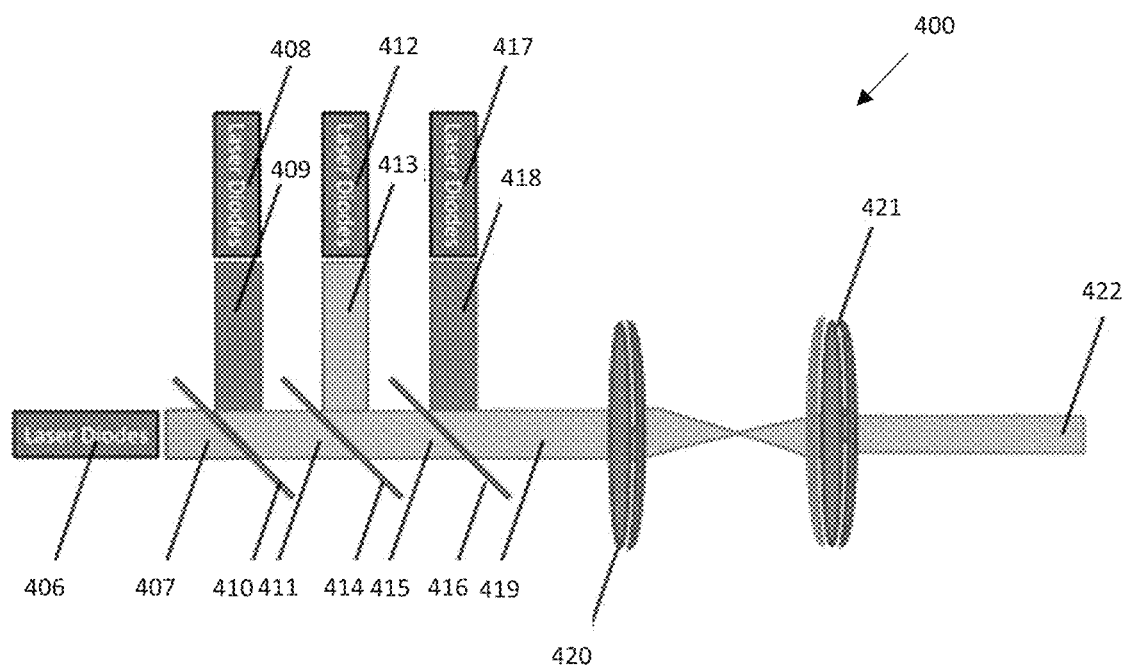

FIG. 4A illustrates a beam combining system 400 having multiple wavelength semiconductor lasers and using transmissive imaging optics. As will be understood, the discussed laser powers and wavelengths are exemplary, as are the selected wavelengths reflected or transmitted by wavelength filters. With the appropriate changes in positioning and use of wavelength filters, greater or lesser numbers of lasers can be used. In certain embodiments, solid state lasers can be substituted or used in combination with semiconductor lasers. In other embodiments, other laser types such as discussed with respect to FIG. 1, including gas, chemical, or metal vapor lasers can be used. In one embodiment, recycling and reuse of rejected light can substitute for a laser. Rejected light available in an additive manufacturing system can be collected, homogenized and re-introduced into a beam line. Advantageously, recycling and re-using rejected light can increase beam intensity and reduce energy costs associated with the system.

In FIG. 4A, semiconductor lasers of a first wavelength (1020 nm) 406 emit a 33.3 kW beam of photons of a corresponding wavelength 407, semiconductor lasers of a second wavelength (1000 nm) 408 emit a 33.3 kW beam of photons of the corresponding wavelength 409, which may then be combined using a wavelength filter 410 that transmits 1020 nm photons, but reflects 1000 nm photons. This results in a combined two-wavelength beam 411 of 66.6 kW. Semiconductor lasers of a third wavelength (980 nm) 412 emit a 33.3 kW beam of photons of the corresponding wavelength 413 which may then be combined with beam 411 using a wavelength filter 414. Wavelength filter 414 transmits 1020 and 1000 nm, but reflects the 980 nm beam, resulting in a three-wavelength beam 415 of 99.9 kW. Semiconductor lasers of a fourth wavelength (960 nm) 417 emit a 33.3 kW beam of photons of the corresponding wavelength 418 which may then be combined with beam 415 using a wavelength filter 416 that transmits 1020 nm, 1000 nm, and 980 nm photons, but reflects 960 nm, resulting in a four-wavelength beam 419 of 133.2 kW. This beam enters the optical imaging system with beam dimensions, for example, of 20 mm×20 mm and a divergence of 1.1 degrees at lenses 420. Lenses 420 may be a series of lenses that use two materials, C79-79 and ULE 7972, each having a different index of refraction, to cancel out the effect of wavelength variance on the ability to image the beam. The beam exits the optical system at 421, which may be a series of lenses that utilizes three materials, ZeruDur, ULE 7972, and C79-79 to cancel out the effect of wavelength variance on the ability to image the beam. The beam at 422 has been increased in intensity as a result of passing through the optical system and may now be 6 mm wide×6 mm tall at 3.67 degrees of divergence resulting in an intensity of 370 kW/cm$^2$, sufficient for the additive manufacturing processing of metals such as powdered stainless steel.

Proper selection of lens material may be necessary for best performance. Transmissive optics such as lenses 420 can be made with fused silica glass. This reduces thermal expansion problems due to extremely low coefficients of absorption at wavelengths near 1000 nm, and reduces thermal expansion of lenses due to the extremely low coefficients of thermal expansion fused silica. The use of fused silica allows for the optics to withstand much higher intensities without heating up and expanding which can lead to fracture, changes in the glass index of refraction, changes in glass shape, and consequent changes in focal points. Unwanted optical changes can also be reduced by use of two or more materials. Each material can have a different index of refraction which changes differently with wavelength. Used in the appropriate combination, the changes in index and optical path length cancel out, and there no variance in focal distance as a function of wavelength.

Figure 4B:
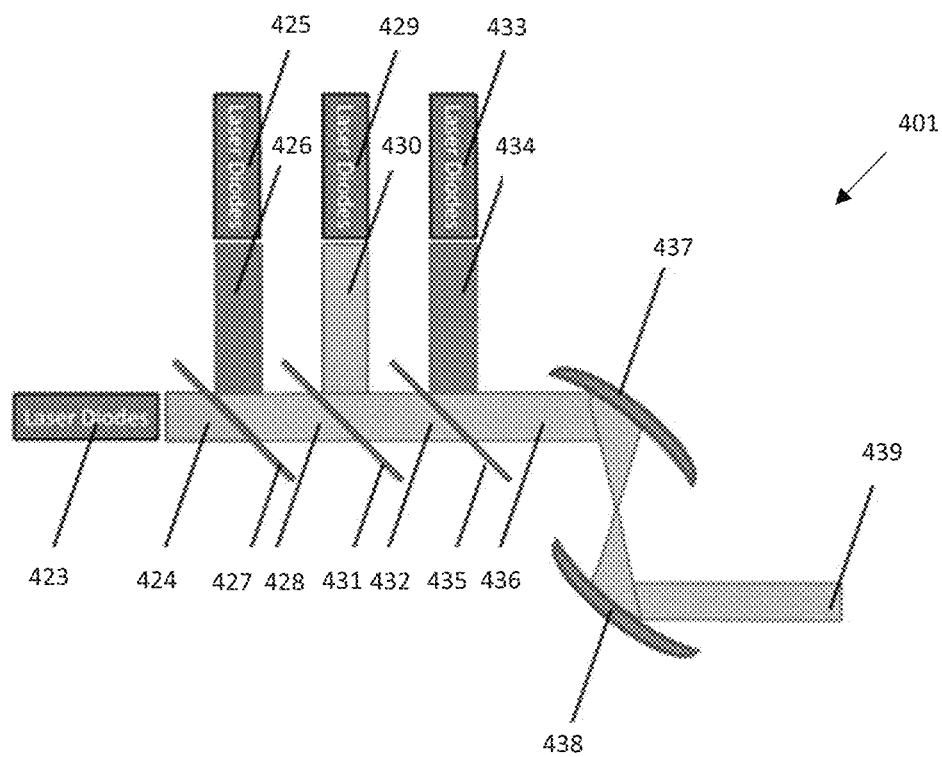

FIG. 4B illustrates an alternative beam combining system 401 that includes a combination of multiple wavelength semiconductor lasers and uses reflective imaging optics to reduce the foregoing discussed issues associated with transmissive optics. Like the beam combining system 400 of FIG. 4A, it will be understood, the discussed laser powers and wavelengths in system 401 are exemplary, as are the selected wavelengths reflected or transmitted by wavelength filters. With the appropriate changes in positioning and use of wavelength filters, greater or lesser numbers of lasers can be used. Multiple types of lasers can be used, and in one embodiment, recycling and reuse of rejected light can substitute for a laser. Rejected light available in an additive manufacturing system can be collected, homogenized and re-introduced into a beam line. Advantageously, reflective optics improve problems associated with semiconductor laser chirp (shift of wavelength over time) during startup transients and over their lifetime. The use of reflective optics prevents detuning of diode laser focus due to this effect and does not affect the resolution achieved or imaging capability. In addition, by using reflective optics, wavelength differences caused by variation in laser operating temperature do not affect the resolution or imaging capability.

In FIG. 4B, semiconductor lasers of a first wavelength (1020 nm) 423 emit a 33.3 kW beam of photons of the corresponding wavelength 424, semiconductor lasers of a second wavelength (1000 nm) 425 emit a 33.3 kW beam of photons of the corresponding wavelength 426. These beams may be combined using a wavelength filter 427 that transmits 1020 nm photons, but reflects 1000 nm photons, resulting may be a two-wavelength beam 428 of 66.6 kW. Semiconductor lasers of a third wavelength (980 nm) 429 emit a 33.3 kW beam of photons of the corresponding wavelength 430. These beams may be combined with beam 428 using a wavelength filter 431 which transmits 1020 and 1000 nm, but reflects 980 nm, resulting in a three-wavelength beam 432 of 99.9 kW. Semiconductor lasers of a fourth wavelength (960 nm) 433 emit a 33.3 kW beam of photons of the corresponding wavelength 434. These beams may be combined with beam 432 using a wavelength filter 435 that transmits 1020 nm, 1000 nm, and 980 nm photons, but reflects 960 nm, resulting in a four-wavelength beam 436 of 133.2 kW. This beam enters the optical imaging system with, for example, beam dimensions of 20 mm×20 mm and a divergence of 1.1 degrees at reflective optic 437. Reflective optics have no dependence on wavelength and do not affect the ability to image the beam. The beam exits the beam combining optical system 401 at reflective optic 438. The beam 439 has been increased in intensity as a result of passing through the optical system and may now ne 6 mm wide×6 mm tall at 3.67 degrees of divergence resulting in an intensity of 370 kW/cm$^2$, sufficient for the additive manufacturing processing of metals such as powdered stainless steel.

Figure 4C:
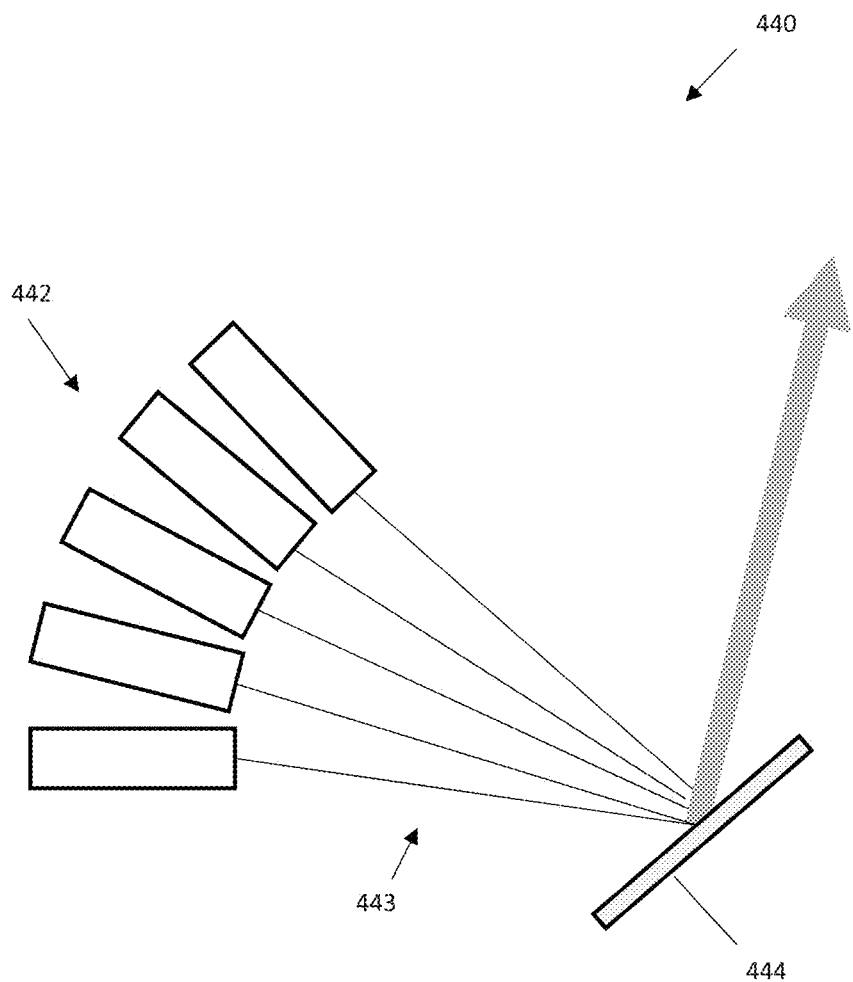

FIG. 4C illustrates an alternative embodiment of a beam combining system 440 that combines beams 443 from same or multiple wavelength lasers 442 using a diffractive imaging optic 444. The diffractive optic can be shaped or patterned to receive beams 443, and reflect them along a substantially same beam axis. As will be understood, while a diffractive optic that reflects beams is shown in FIG. 4C, in other embodiments the diffractive optic can transmit beams, or use a combination of reflective, transmissive, or other suitable beam steering optical assemblies or components.

Figure 5A:
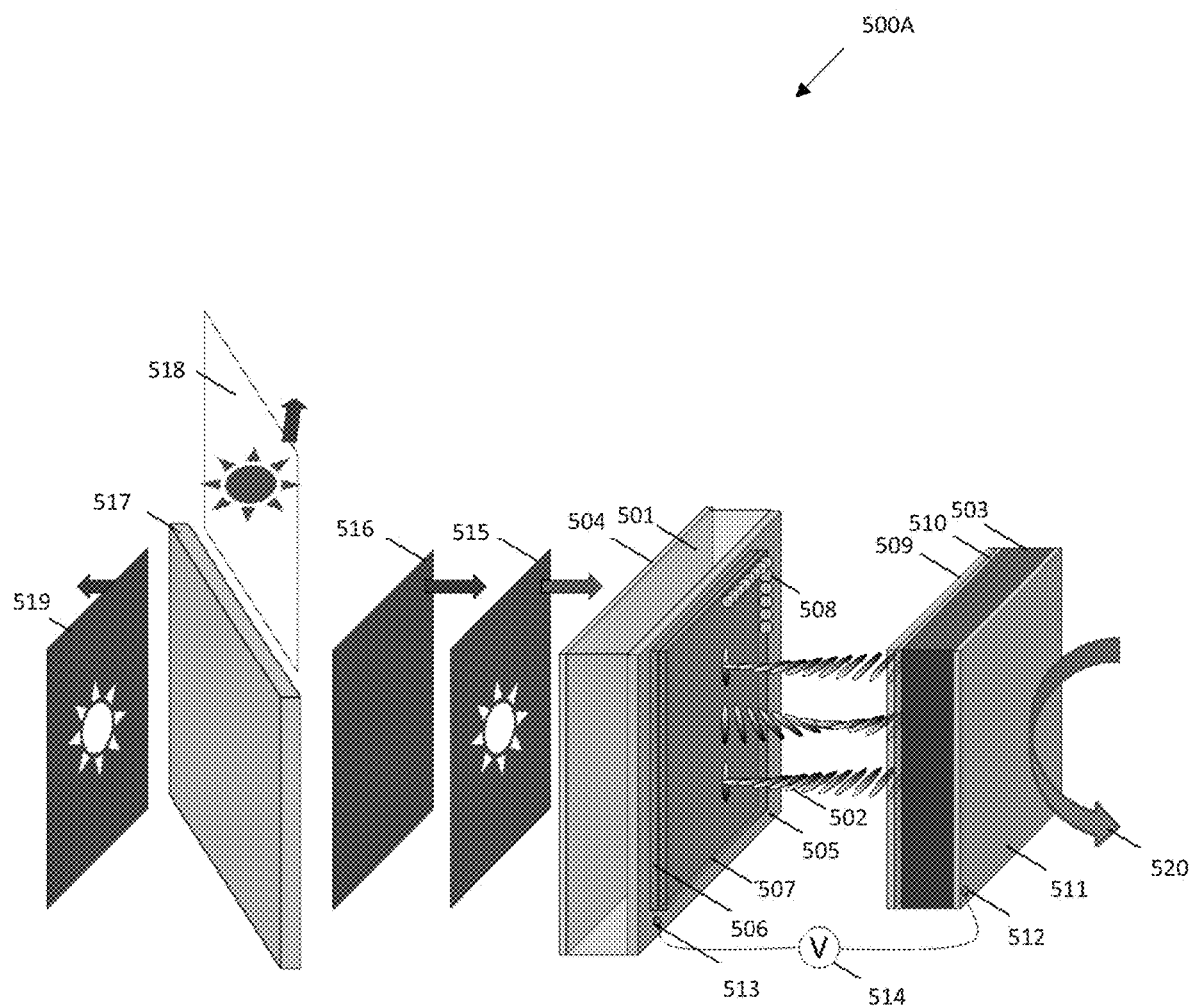
FIGS. 5A-B illustrate reflective light patterning unit embodiments.

FIG. 5A is a reflective optically addressed light valve system 500A useful in additive manufacturing systems such as disclosed herein. Reflective light valves do not need to transmit light through a transparent semiconductor for light patterning, where at high average power levels, even small amounts of absorption can cause unwanted and catastrophic heating. Reflective light valves can also allow for a greater ease of cooling on the reflective surface, with cooling on an opposing side to where the write beam and the read beam are incident.

As seen in FIG. 5A, the reflective optically addressed light valve system 500A may be capable of patterning an energy beam and may be composed of a highly transmissive layer 501, a twisted nematic (TN) liquid crystal layer 502, and a photoconductor layer 503. The highly transmissive layer may be optically transparent for 1000 nm and 700 nm light, made from glass substrate (C79-79 fused silica) 501 which has anti-reflective coatings on both sides at 504 and 506. An Indium Tin Oxide (ITO) conductive coating may be applied to highly transmissive layer 501 at 505. Layer 502 may be anchored to 506 and 510 by way of anchoring substrates 507 and 509. The exact spacing of 502 may be given by the size of the spacer balls 508 which define a gap of 2.5 microns, tuned for maximum contrast ratio when passing 100 0 nm light in a double pass. Layer 503 may be made of a single crystalline silicon semiconductor with a high reflection dielectric coating applied at 510 which may be transparent to 700 nm, but reflective at 1000 nm. Layer 511 may be another layer of ITO which has a solder point attached 512 and may be connected to layer 505 by way of an AC voltage source 514 by way of another solder point 513. A patterned write beam of light may be emitted from a projector source at 700 nm and may be incident on 503 after transmitting through 504, 501, 505, 506, 507, 502, 509 and 510. Where the write beam strikes 503 electrons move from the valence band to the conduction band, greatly increasing the local electrical conductivity of 503, allowing current to flow from 511 through 503, 510, 509, 502, 507, and 506 to 505. As current flows through the TN liquid crystal 502, it induces rotation in the liquid crystal 502 causing polarization rotation in transmitted light. The "read" beam 516 may be p-polarized and may be incident on 510 after transmitting through 504, 501, 505, 506, 507, 502, and 509 at which point it reflects and transmits back through 509, 502, 507, 506, 505, 501, and 504 to exit the light valve system 500A. This beam may then be incident on a polarizer 517 which reflects s-polarization resulting in reflected beam 518 and transmits p-polarization resulting in transmitted beam 519. Even though absorption may be very low in the device the HR coating 509 is not perfectly reflecting and some energy may be absorbed. This energy may be removed by radiative, conductive, or convective cooling 520.

Figure 5B:
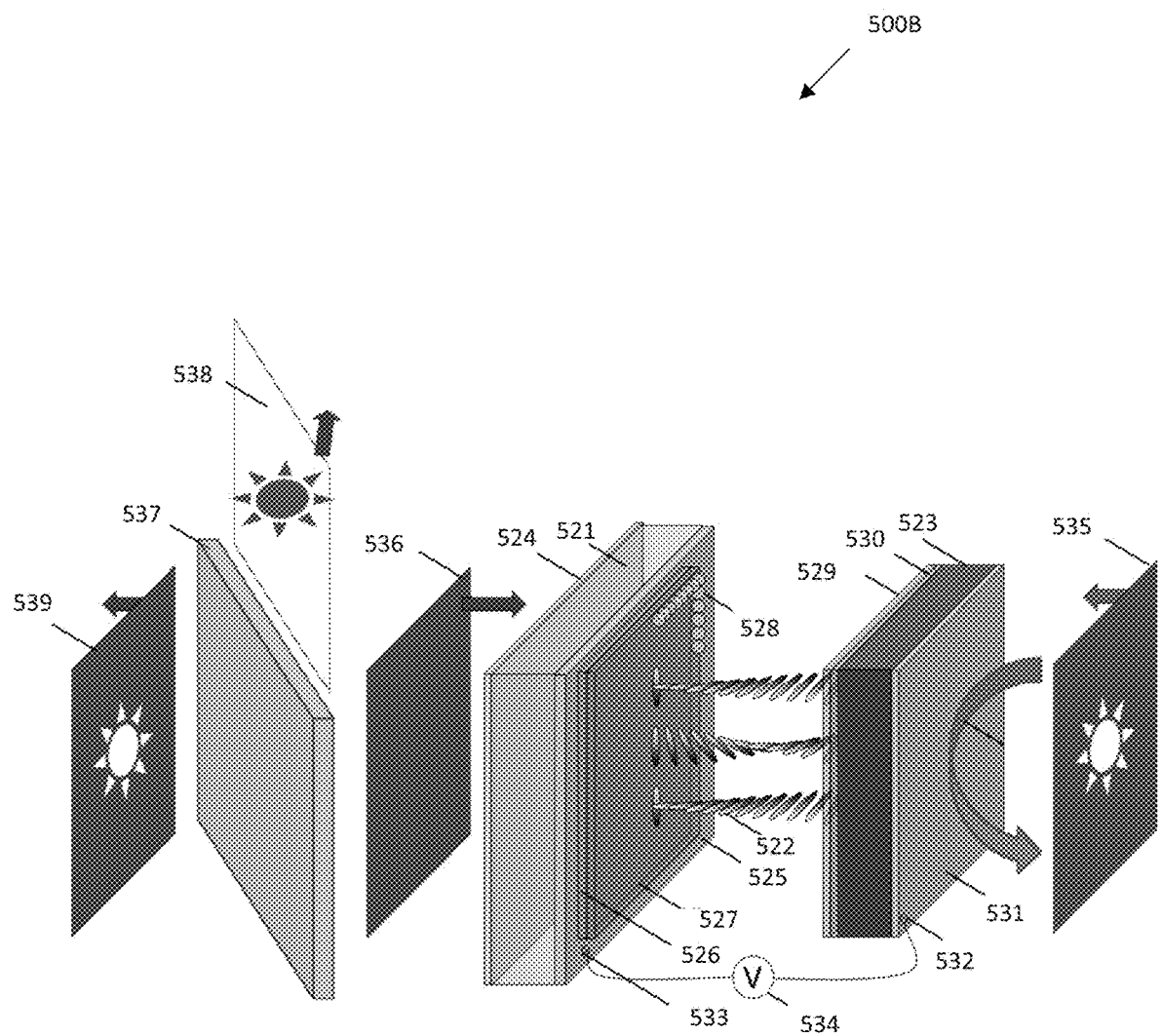

FIG. 5B illustrates an alternative reflective optically addressed light valve 500B with cooling on one side where the write beam and the read beam are incident from the different sides. The valve may be composed of a highly transmissive layer 521, a twisted nematic (TN) liquid crystal layer 522, and a photoconductor layer 523. The highly transmissive layer may be optically transparent for 1000 nm and 700 nm light, made from glass substrate (C79-79 fused silica) 521 which has anti-reflective coatings on both sides at 524 and 526. An Indium Tin Oxide (ITO) conductive coating may be applied to 521 at 525. Layer 522 may be anchored to 526 and 530 by way of anchoring substrates 527 and 529. The exact spacing of 522 may be given by the size of the spacer balls 528 which define a gap of 2.5 microns, tuned for maximum contrast ratio when passing 1000 nm light in a double pass. Layer 523 may be made of a single crystalline silicon semiconductor with a high reflection dielectric coating applied at 530 which reflective at 1000 nm. Layer 531 may be another layer of ITO which has a solder point attached 532 and may be connected to layer 525 by way of an AC voltage source 534 by way of another solder point 533. A patterned write beam of light may be emitted from a projector source at 700 nm and may be incident on 523 after transmitting through an optional convective/conductive substrate 540 and through the ITO coating 531. Where the write beam strikes 503 electrons move from the valence band to the conduction band, greatly increasing the local electrical conductivity of 523, allowing current to flow from 531 through 523, 530, 529, 522, 527, and 526 to 525. As current flows through the TN liquid crystal 522, it induces rotation in the liquid crystal 522 causing polarization rotation in transmitted light. The "read" beam 536 may be p-polarized and may be incident on 530 after transmitting through 524, 521, 525, 526, 527, 522, and 529 at which point it reflects and transmits back through 529, 522, 527, 526, 525, 521, and 524 to exit the light valve. This beam may then be incident on a polarizer 537 which reflects s-polarization resulting in reflected beam 538 and transmits p-polarization resulting in transmitted beam 539. Even though absorption may be very low in the device the HR coating 529 is not perfectly reflecting and some energy may be absorbed. This energy may be removed by radiative, conductive, or convective cooling 540.

Figure 5C:
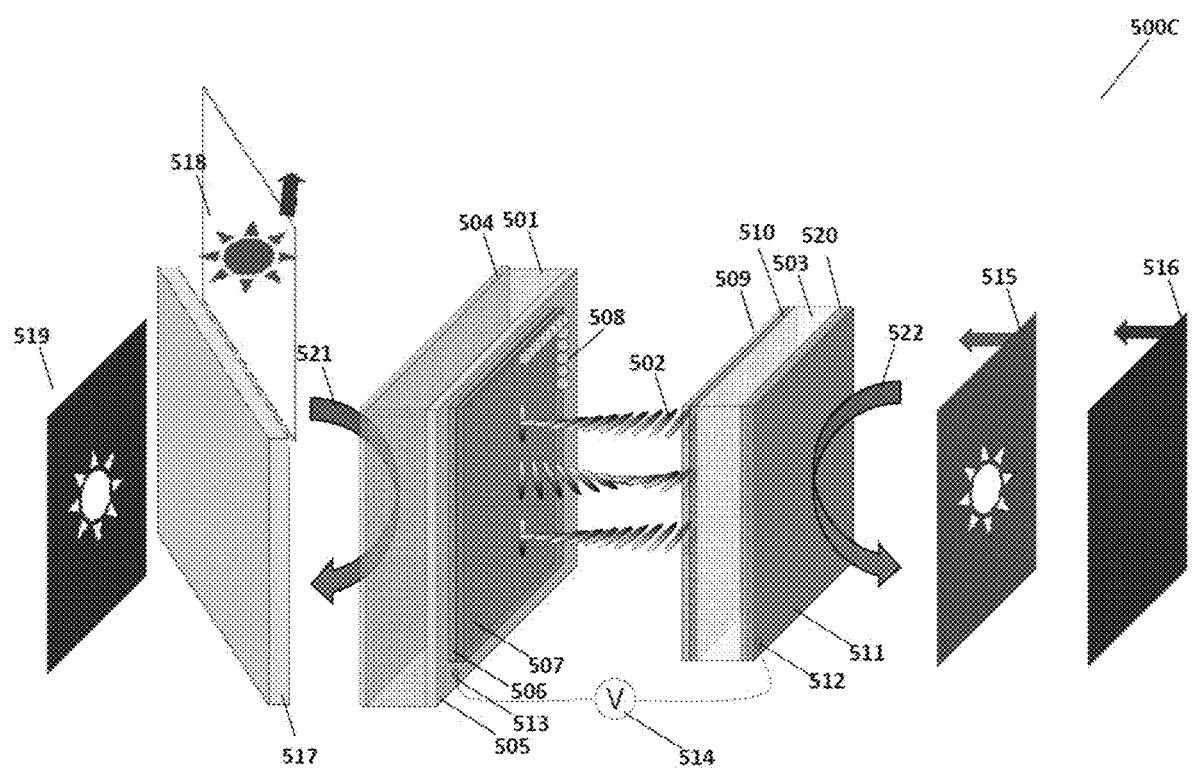
FIG. 5C illustrates one embodiment of a transmissive light patterning unit.

As seen in FIG. 5C, a transmissive optically addressed light valve system 500C may be capable of patterning an energy beam and may be composed of a highly transmissive layer 501, a twisted nematic (TN) liquid crystal layer 502, and a photoconductor layer 503. The highly transmissive layer may be optically transparent for 1000 nm and 700 nm light, made from glass substrate (C79-79 fused silica) 501 which has anti-reflective coatings on both sides at 504 and

506. An Indium Tin Oxide (ITO) conductive coating may be applied to highly transmissive layer 501 at 505. Layer 502 may be anchored to 506 and 510 by way of anchoring substrates 507 and 509. The exact spacing of 502 may be given by the size of the spacer balls 508 which define a gap of 5 microns, tuned for maximum contrast ratio when passing 1000 nm light in a single pass. Layer 503 may be made of a single crystalline Bismuth Silicon Oxide semiconductor with a anti-reflection dielectric coating applied on both sides at 510 and at 520. Layer 511 may be another layer of ITO which has a solder point attached 512 and may be connected to layer 505 by way of an AC voltage source 514 by way of another solder point 513. A patterned write beam of light may be emitted from a projector source at 450 nm and may be incident on 503 after transmitting through 511 and 520. Where the write beam strikes 503 electrons move from the valence band to the conduction band, greatly increasing the local electrical conductivity of 503, allowing current to flow from 511 through 520, 503, 510, 509, 502, 507, and 506 to 505. As current flows through the TN liquid crystal 502, it induces rotation in the liquid crystal 502 causing polarization rotation in transmitted light. The "read" beam 516 may be p-polarized and may transmit through 511, 520, 503, 510, 509, 502, 507, 506, 505, 501, and 504 to exit the light valve system 500C. This beam may then be incident on a polarizer 517 which reflects s-polarization resulting in reflected beam 518 and transmits p-polarization resulting in transmitted beam 519. Even though absorption may be very low in the device, due to imperfections in the materials and coatings some energy may be absorbed. This energy may be removed by radiative, conductive, or convective cooling 521 and 522. If convective, the cooling is removed by a fluid that is extremely transparent to both 1000 nm light and 450 nm light.

Referring to FIGS. 6-17, one or more systems set forth hereinabove or a system comprising one or more components or features set forth hereinabove may support, enable, or provide spatial modulation of radiant energy (e.g., diode light). For example, as set forth hereinabove, a system comprising a dynamic mask may selectively amalgamate a powdered material 144 to additively form one or more three-dimensional objects. In selected embodiments, a system comprising a dynamic mask may also manipulate the thermal profile in an article processing unit 140 during the printing process. That is, a system may use a dynamic mask to control heating and cooling rates during or after an amalgamation process to achieve a desired crystalline structure or material property. Thus, in certain embodiments, a system may heat treat one or more three-dimensional objects or one or more portions or layers thereof as they are being printed.

In materials science, different heat treatments such as quenching, annealing, and the like produce different properties within a material. Quenching is a process wherein a material is rapidly cooled after it has been heated. The rapid cooling prevents certain phase transformations. For example, quenching may prevent the formation of large crystal grains that require more time to form. Thus, quenching may reduce crystal grain size and, as a result, increase the hardness of the material. With steel, quenching may result in a relatively hard grain structure called martensite, whereas a slow cool may result in a relatively soft structure such as pearlite.

Annealing is a process wherein a material is allowed to cool slowly after is has been heated. The slow cooling may increase the ductility of the material. For example, to anneal steel, it may be heated to slightly above the austenitic temperature and held there. This may allow the steel to fully adopt an austenite or austenite-cementite grain structure. Thereafter, the steel may be allowed to cool slowly. For example, the steel may be allowed to "furnace cool" wherein the furnace is turned off and the steel is left inside to cool slowly with the surrounding furnace. Alternatively, "air cooling" (e.g., removing the steel from the heat source and letting ambient air conduct and/or convect the heat away) may be sufficiently slow. In general, to anneal steel it may be cooled slowly enough to form pearlite, ferrite, and/or cementite and not bainite and/or martensite.

Area printing in accordance with the present invention may allow for selected areas (e.g., relatively large areas) to be printed at once. This ability may also allow for control of the spatial energy distribution within an article processing unit 140. Due to the very thin layers that are used in the additive process, heat transfer out of a newly formed layer may be rapid, and the material may cool rapidly once amalgamation (e.g., amalgamation of granules and amalgamation to an underlying substrate or layer) has occurred. There are cases where these rapid cooling rates are desired as they may produce a quenching effect and corresponding material properties. There are other cases, where a slower cooling is desired to produce more of an annealing effect. Accordingly, in those cases, a system may control the spatial energy distribution within an article processing unit 140 to slow the cooling of amalgamated material. This may be accomplished using a single laser to perform heat treatment processes concurrently with additive manufacture. Alternatively, it may be accomplished using one or more lasers to perform heat treatment, while one or more other lasers perform additive manufacture.

In selected embodiments, greyscale modulation of radiant energy may be achieved through an optically addressed light valve. A light valve may modulate fluence using partial polarization rotation of the system. Alternatively, in addition thereto, a light valve may modulate fluence using pulse width modulation (PWM), wherein the duty cycles or exposure time of radiant energy are controlled to achieve average power intensities on the material in the article processing unit 140 that are desired within the time scales of the corresponding printing process. Accordingly, through spatial control of the average power intensity reaching a granular material during a printing process, not only may the granular material be amalgamated to create additively manufactured three-dimensional parts, but the cooling rates of the amalgamated material may be controlled to produce the desired crystalline structures therewithin.

In selected embodiments, spatial control of the average power intensity reaching a granular material may be applied to certain granular material 144 that is not amalgamated. That is, spatial control of energy distribution may allow for control of lateral heat flow away from a portion that has been amalgamated to surrounding particles that have not been amalgamated. For example, edge effects may be mitigated by heating the area around the locations to be printed such that heat loss is minimized and proper printing is achieved.

Figure 6:
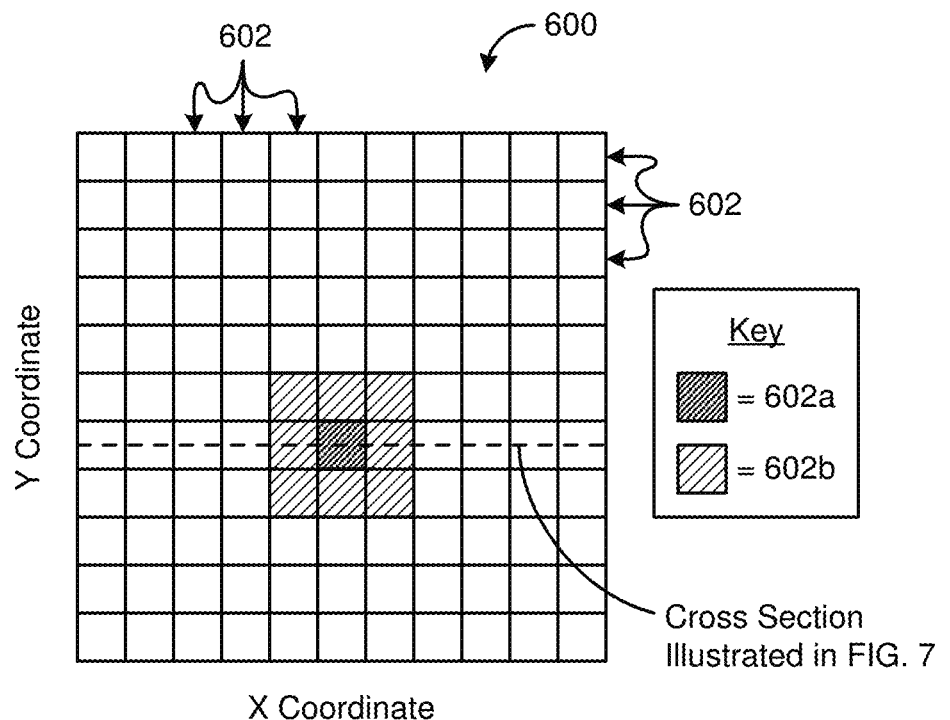
FIG. 6 is a top plan view of one exemplary embodiment of a print area divided up into an array of "pixels," wherein a first pixel thereof corresponds to an area that will be printed and one or more adjacent pixels (e.g., one or more pixels adjacent to the first pixel) correspond to areas where supplemental heat will be applied to slow the cooling of the printed area after amalgamation has been completed.

FIG. 6 illustrates an exemplary spatial shaping that may be applied by a system in accordance with the present invention to produce multi-pixel, heat-treatment compensation with post-fusing annealing. In this example, the total area printed in a single image print may be represented by or correspond to a grid 600. The grid 600 may define or comprise an array of portions or "pixels" 602, any of which may potentially be printed if sufficient radiant energy is directed thereto (e.g., if one or more light valves corresponding thereto, as controlled by a corresponding processor running appropriate software stored in memory, permit sufficient radiant energy to pass therethrough). However, in this example, only one pixel 602*a* has been, is being, or will be printed (i.e., will have sufficient radiant energy directed thereto to amalgamate the corresponding material). Accordingly, to slow the rate of heat transfer away from the amalgamated material corresponding to that printed pixel 602*a*, a system may direct at least some radiant energy to the granular material 144 corresponding to one or more adjacent pixels 602*b*.

Figure 7:
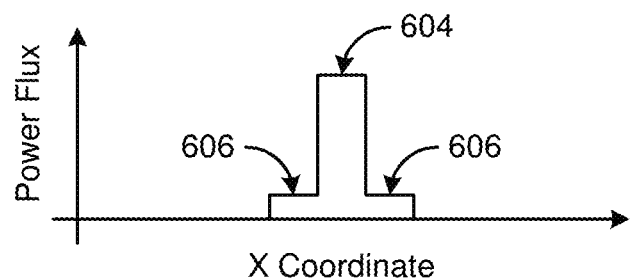
FIG. 7 is a plot of radiant power flux versus a spatial coordinate at a particular instant in time for a particular cross-section of the array illustrated in FIG. 6.

That is, as shown in FIG. 7, "first" radiant energy 604 directed to the granular material 144 corresponding to the printed pixel 602*a* may be sufficient (e.g., have an intensity or power flux sufficiently high) to amalgamate that material 144. On the other hand, "second" radiant energy 606 directed to the granular material 144 corresponding to the one or more adjacent pixels 602*b* may be insufficient (e.g., have an intensity or power flux insufficiently high) to amalgamate that material 144. However, the second radiant energy 606 may be sufficient (e.g., have an intensity or power flux sufficiently high) to increase the temperature of the granular material 144 corresponding to the one or more adjacent pixels 602*b* and, thereby, slow the rate at which the granular material 144 corresponding to the printed pixel 206*a* cools after it has been amalgamated.

Accordingly, the number of surrounding or adjacent pixels 602*b* heated, how deep the adjacent pixels 602*b* extend (e.g., how many rows of pixels 602*b* are heated), and the amount of heat applied to the granular material 144 corresponding to the adjacent pixels 602 each represent a separate variable that may be used, adjusted, or tuned (alone or in combination with one or more other variables) by a system or one or more operators thereof to control the rate at which selected amalgamated material cools and the resulting heat treatment that cooling provides.

In certain embodiments, the first and second radiant energy may originate with different sources or "flows" of radiant energy. For example, the first radiant energy may originate with a first laser beam, while the second radiant energy may originate with a second laser beam that is distinct from the first laser beam. Alternatively, the first and second radiant energy may originate with the same source or "flow" of radiant energy. For example, the first and second radiant energy may originate with the same laser beam. However, the first radiant energy may correspond to an non-attenuated or less attenuated portion of that beam, while the second radiant energy may correspond to an attenuated or more attenuated portion of that beam. In selected embodiments, such selective attenuation may be provided by a light value (e.g., an addressable light valve) that modulates fluence of the various pixels 602 of a print area 600 using partial polarization rotation, pulse width modulation (PWM), or the like as set forth hereinabove.

Figure 8:
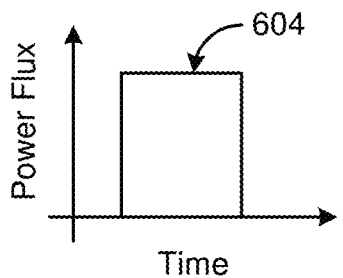
FIG. 8 is a plot of radiant power flux versus time for the radiant energy directed to the granular material corresponding to the first pixel of FIG. 6.
Figure 9:
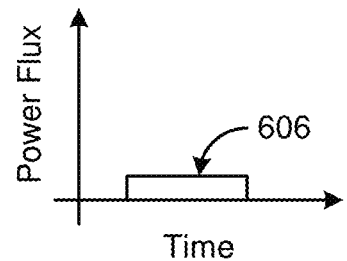
FIG. 9 is a plot of radiant power flux versus time for the radiant energy directed to the granular material corresponding to the one or more adjacent pixels of FIG. 6.

In FIGS. 8 and 9, exemplary plots of power flux versus time are illustrated for the first and second radiant energy 604, 606, respectively. As shown, the first radiant energy may be applied to the granular material 144 corresponding to the printed pixel 602*a* at the same time that the second radiant energy is applied to the granular material 144 corresponding to the one or more adjacent pixels 602*b*. Similarly, the application of the first radiant energy to the granular material 144 corresponding to the printed pixel 602*a* may end at the same time that the application of the second radiant energy to the granular material 144 corresponding to the one or more adjacent pixels 602*b* ends.

As further shown, the power flux corresponding to the first radiant energy 604 may decrease precipitously once the desired end time is reached (i.e., once sufficient heat has been applied to properly amalgamate the granular material 144). Such a power flux profile may result in an extremely fast cooling rate (e.g., a cooling rate of about 1000 K/s or greater) capable of forming martensitic crystal structures in the case of carbon steel alloys (i.e., when the amalgamated material comprises a carbon steel alloy). Accordingly, without the second radiant energy 606, the amalgamated material corresponding to the printed pixel 602*a* may experience a quenching effect. Conversely, with the second radiant energy 606, the cooling of the amalgamated material corresponding to the printed pixel 602*a* may be slowed sufficiently to avoid a quenching effect, provide an annealing effect, or the like.

Figure 10:
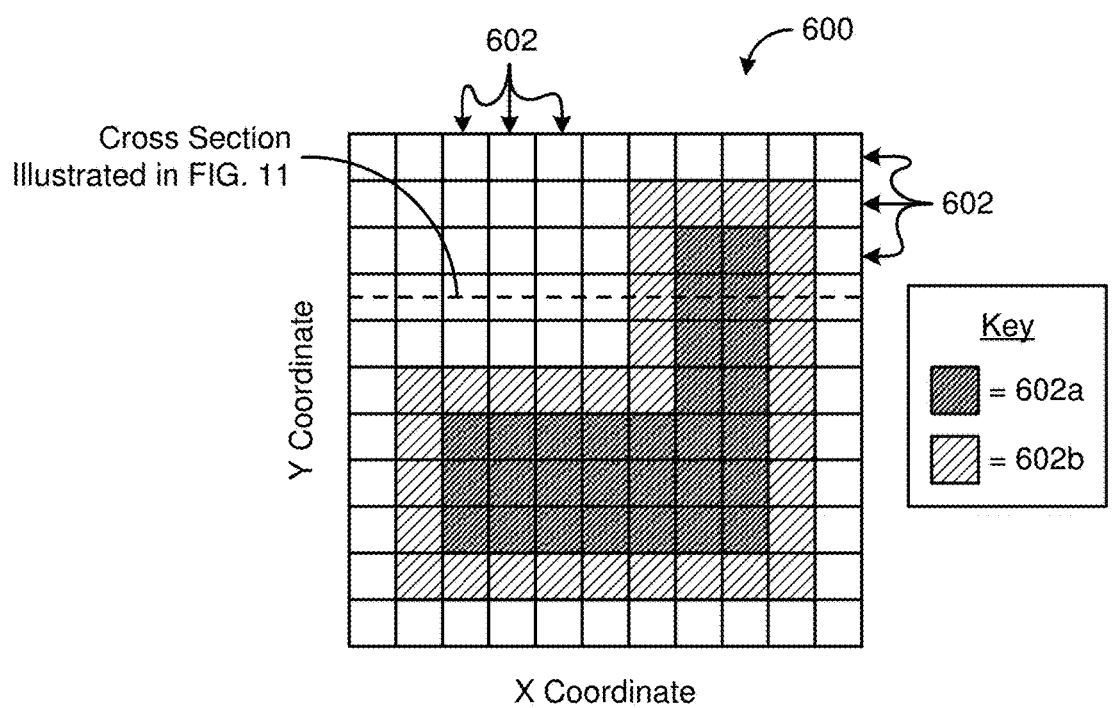
FIG. 10 is a top plan view of another exemplary embodiment of a print area divided up into an array of "pixels," wherein a first group of pixels thereof correspond to an area that will be printed and one or more adjacent pixels (e.g., one or more pixels adjacent to the first group of pixels) correspond to areas where supplemental heat will be applied to slow the cooling of the printed area after amalgamation has been completed.

FIG. 10 illustrates another exemplary spatial shaping that may be applied by a system in accordance with the present invention to produce multi-pixel, heat-treatment compensation with post-fusing annealing. In this example, the total area printed in a single image print may also be represented by or correspond to a grid 600. The grid 600 may define or comprise an array "pixels" 602, any of which may potentially be printed if sufficient radiant energy is directed thereto (e.g., if one or more light valves corresponding thereto, as controlled by a corresponding processor running appropriate software stored in memory, permit sufficient radiant energy to pass therethrough). However, in this example, only selected pixels 602*a* have been, are being, or will be printed. Accordingly, to slow the rate of heat transfer away from the amalgamated material corresponding to those printed pixel 602*a*, a system may direct at least some radiant energy to the granular material 144 corresponding to one or more adjacent pixels 602*b*.

Figure 11:
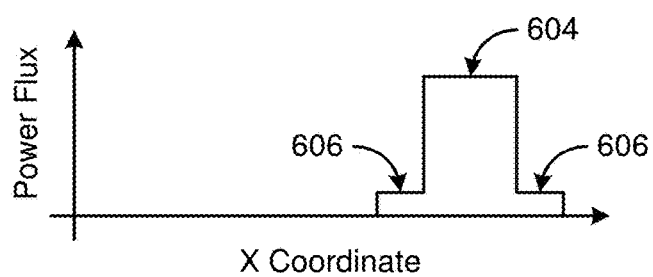
FIG. 11 is a plot of radiant power flux versus a spatial coordinate at a particular instant in time for a particular cross-section of the array illustrated in FIG. 10.

As shown in FIG. 11, the first radiant energy 604 may be sufficient (e.g., have an intensity or power flux sufficiently high) to amalgamate the granular material 144 corresponding to the printed pixels 602*a*. Conversely, the second radiant energy 606 may be insufficient (e.g., have an intensity or power flux insufficiently high) to amalgamate the granular material 144 corresponding to the adjacent pixels 602*b*. However, the second radiant energy 606 may again be sufficient (e.g., have an intensity or power flux sufficiently high) to increase the temperature of the granular material 144 corresponding to the one or more adjacent pixels 602*b* and, thereby, slow the rate at which the granular material 144 corresponding to the printed pixels 206*a* cools after it has been amalgamated.

Figure 12:
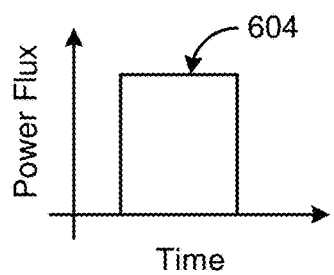
FIG. 12 is a plot of radiant power flux versus time for the radiant energy directed to the granular material corresponding to the first group of pixels of FIG. 10.
Figure 13:
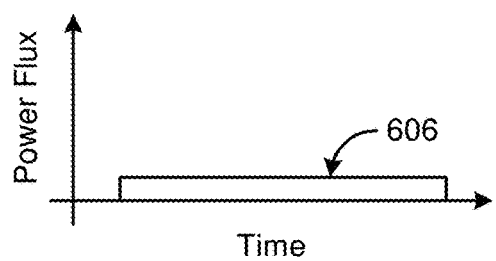
FIG. 13 is a plot of radiant power flux versus time for the radiant energy directed to the granular material corresponding to the one or more adjacent pixels of FIG. 10.

In FIGS. 12 and 13, exemplary plots of power flux versus time are illustrated for the first and second radiant energy 604, 606, respectively. As shown, the first radiant energy may be applied to the granular material 144 corresponding to the printed pixel 602*a* at the same time that the second radiant energy is applied to the granular material 144 corresponding to the one or more adjacent pixels 602*b*. However, the application of the first radiant energy to the granular material 144 corresponding to the printed pixel 602*a* may end sooner than the application of the second radiant energy to the granular material 144 corresponding to the one or more adjacent pixels 602*b*. Accordingly, the length of time over which the second radiant energy 606 is applied may be another variable that may be used, adjusted, or tuned (alone or in combination with one or more other variables) by a system or one or more operators thereof to control the rate at which selected amalgamated material cools and the resulting heat treatment that cooling provides.

Figure 14:
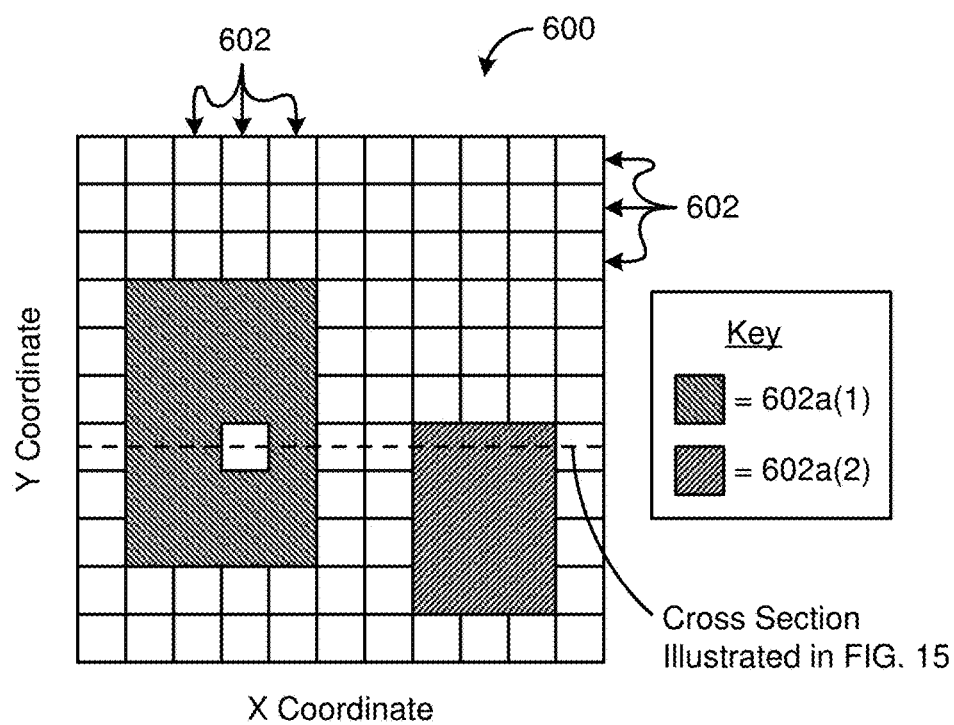
FIG. 14 is a top plan view of another exemplary embodiment of a print area divided up into an array of "pixels," wherein a first and second groups of pixels thereof correspond to different areas that will be printed.

FIG. 14 illustrates an exemplary spatial shaping that may be applied by a system in accordance with the present invention to produce multi-pixel, heat-treatment compensation with post-fusing annealing and quenching. In this example, the total area printed in a single image print may also be represented by or correspond to a grid 600. The grid 600 may define or comprise an array "pixels" 602, any of which may potentially be printed if sufficient radiant energy is directed thereto (e.g., if one or more light valves corresponding thereto, as controlled by a corresponding processor running appropriate software stored in memory, permit sufficient radiant energy to pass therethrough). However, in this example, only selected pixels 602a have been, are being, or will be printed. Moreover, those printed pixels 602a may be divided into two groups or categories 602a(1), 602a(2), which in this example, will be heat treated differently.

Figure 15:
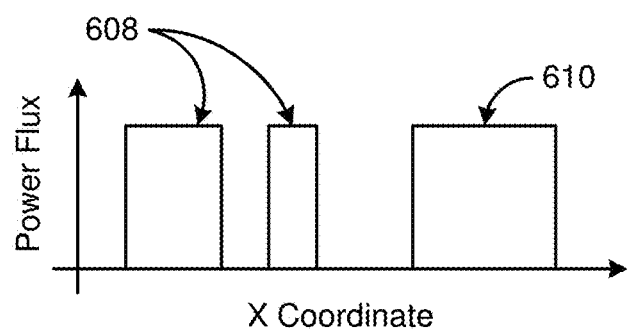
FIG. 15 is a plot of radiant power flux versus a spatial coordinate at a particular instant in time for a particular cross-section of the array illustrated in FIG. 14.

As shown in FIG. 15, the radiant energy 608 directed to the granular material 144 corresponding to the first category of printed pixels 602a(1) may be sufficient (e.g., have an intensity or power flux sufficiently high) to amalgamate that material 144. Similarly, the radiant energy 610 directed to the granular material 144 corresponding to the second category of printed pixels 602a(2) may be sufficient (e.g., have an intensity or power flux sufficiently high) to amalgamate that material 144. However, with respect to time, the radiant energy corresponding to the first category of printed pixels 602a(1) may differ from the radiant energy corresponding to the second category of printed pixels 602a(2).

Figure 16:
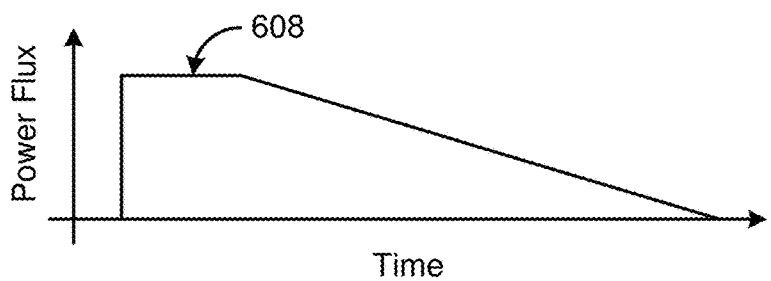
FIG. 16 is a plot of radiant power flux versus time for the radiant energy directed to the granular material corresponding to the first group of pixels of FIG. 14.
Figure 17:
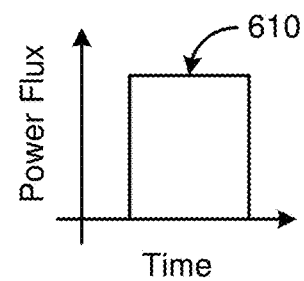
FIG. 17 is a plot of radiant power flux versus time for the radiant energy directed to the granular material corresponding to the second group of pixels of FIG. 14.

For example, as shown in FIGS. 16 and 17, the radiant energy corresponding to the first category of printed pixels 602a(1) may be applied at the same time that the radiant energy corresponding to the second category of printed pixels 602a(2) is applied. However, the application of the former may end after (e.g., relatively long after) the application of the latter ends. Moreover, after proper amalgamation has been achieved, the former may decrease (e.g., gradually decrease) over time, while the latter may end more abruptly. For example, the former may decrease so as to provide a relatively gradual, 600° C. cooling (e.g., a change in temperature of about 600° C. in the corresponding amalgamated material) over a period of about 100 seconds. Thereafter, the corresponding amalgamated material may rapidly cool to the average temperature of the print bed.

The decrease over time of the radiant energy corresponding to the first category of printed pixels 602a(1) may slow the cooling of the amalgamated material corresponding to those printed pixels 602a(1) sufficiently to avoid a quenching effect, provide an annealing effect, or the like. Conversely, the relatively abrupt end of the radiant energy corresponding to the second category of printed pixels 602a(2) may result in an extremely fast cooling rate (e.g., a cooling rate of about 1000 K/s or greater) capable of forming martensitic crystal structures in the case of carbon steel alloys (i.e., when the amalgamated material comprises a carbon steel alloy). Accordingly, the amalgamated material corresponding to the second category of printed pixels 602a(2) may experience a quenching effect. Thus, decreases (e.g., gradual decreases) in radiant energy over time may be another variable that may be used, adjusted, or tuned (alone or in combination with one or more other variables) by a system or one or more operators thereof to control the rate at which selected amalgamated material cools and the resulting heat treatment that cooling provides.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," "selected embodiments," "certain embodiments," etc., indicate that the embodiment or embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A method of additive manufacture, the method comprising:
   distributing a layer of a granular material;
   outputting an energy beam onto an energy patterning unit;
   blocking a portion of the energy beam by the energy patterning unit such that an output of the energy patterning unit is a greyscale modulated two-dimensional pattern;
   directing the greyscale modulated two-dimensional pattern at a two-dimensional grid of pixels defined over the layer of the granular material such that the greyscale modulated two-dimensional pattern simultaneously:
      provides a first level of fluence sufficient to melt the granular material in first pixels of the two-dimensional grid of pixels;
      provides a second level of fluence incident on second pixels of the two-dimensional grid of pixels that heats but does not melt the granular material in the second pixels such that a rate at which heat flows from the first pixels into the second pixels is slowed; and
      provides no fluence on third pixels of the two-dimensional grid of pixels;
   rejecting, by the energy patterning unit, selected radiant energy of the energy beam that is not within the greyscale modulated two-dimensional pattern; and
   reusing, by a rejected energy handling unit, the rejected radiant energy of the energy beam by transferring the rejected radiant energy to passive or active cooling elements of a thermal management system that remove heat from the energy patterning unit,
   wherein:
      the energy patterning unit includes a pixel-addressable light valve, and
      the energy patterning unit determines the greyscale modulated two-dimensional pattern by the pixel-addressable light valve passing and rejecting the energy beam pixel by pixel.

2. The method of claim 1, further comprising generating, by a diode array, the energy beam.

3. The method of claim 2, further comprising permitting, by the energy patterning unit, the energy beam to proceed to the first pixels unmasked by the energy patterning unit.

4. The method of claim 3, further comprising permitting, by the energy patterning unit, the energy beam to proceed to the second pixels partially masked by the energy patterning unit to reduce an intensity thereof.

5. A method of additive manufacture, the method comprising:
distributing a layer of a granules of a material;
sequentially dwelling, by an energy beam, on each section of a plurality of sections of the layer;
directing, via an energy patterning unit while the energy beam dwells on a first section of the plurality of sections, a first radiant energy of the energy beam at a first portion of the first section, the first portion having a greyscale two-dimensional pattern determined by the energy patterning unit;
rejecting, by the energy patterning unit during the directing of the first radiant energy, selected radiant energy of the energy beam that is not within the greyscale two-dimensional pattern;
reusing, by a rejected energy handling unit, the rejected radiant energy of the energy beam by transferring the rejected radiant energy to passive or active cooling elements of a thermal management system that remove heat from the energy patterning unit,
amalgamating, by the first radiant energy while the energy beam dwells on the first section, all granules of the material that correspond to the first portion;
lowering, while the energy beam dwells on the first section, a rate at which the first portion cools by directing, after the amalgamating, a second radiant energy of the energy beam at the first portion, wherein the second radiant energy has a maximum intensity that is below a maximum intensity of the first radiant energy; and
changing, during the directing of the second radiant energy, an attenuation of the second radiant energy,
wherein the changing of the attenuation of the second radiant energy comprises reducing the second radiant energy linearly over time.

6. The method of claim 5, wherein the amalgamating comprises heating, by the first radiant energy, all granules of the material that correspond to the first portion to at least a melting point of the material.

7. The method of claim 6, further comprises letting, after the amalgamating, the material that corresponds to the first portion cool below the melting point.

8. The method of claim 7, wherein the second radiant energy is insufficient to melt the material.

9. The method of claim 8, further comprising generating, by a diode array, the energy beam.

10. The method of claim 9, wherein the directing of the second radiant energy comprises directing the second radiant energy through the energy patterning unit.

11. The method of claim 10, wherein the changing comprises increasing a masking produced by the energy patterning unit.

12. A method of additive manufacture, the method comprising:
distributing a layer of a granules of a material;
sequentially dwelling, by an energy beam, on each section of a plurality of sections of the layer;
directing, via an energy patterning unit, a two-dimensional greyscale pattern such that while the energy beam dwells on a first section of the plurality of sections, a first radiant energy of the energy beam is simultaneously directed at a first portion of the first section and a second radiant energy of the energy beam is directed at a second portion of the first section, the first portion having a first two-dimensional pattern determined by the energy patterning unit;
amalgamating, by the first radiant energy while the energy beam dwells on the first section, all granules of the material that correspond to the first portion; and
reusing, by a rejected energy handling unit, the rejected radiant energy of the energy beam by transferring the rejected radiant energy to passive or active cooling elements of a thermal management system that remove heat from the energy patterning unit,
wherein the second radiant energy is different in intensity from the first radiant energy and the second portion has a second two-dimensional pattern determined by the energy patterning unit that is different in shape from the first two-dimensional pattern.

13. The method of claim 12, wherein at least one of the first and second radiant energy is spatially modulated while the energy beam dwells on the first section.

14. The method of claim 12, wherein at least one of the first and second radiant energy is temporally modulated while the energy beam dwells on the first section.

* * * * *